United States Patent [19]

Korsky et al.

[11] Patent Number: 4,577,310

[45] Date of Patent: Mar. 18, 1986

[54] STATION INTERFACE FOR DIGITAL ELECTRONIC TELEPHONE SWITCHING SYSTEM HAVING CENTRALIZED DIGITAL AUDIO PROCESSOR

[75] Inventors: Vincent V. Korsky, Shelton; Chansak Laotetpitaks, Woodbridge, both of Conn.

[73] Assignee: TIE/Communications, Inc., Shelton, Conn.

[21] Appl. No.: 610,700

[22] Filed: May 16, 1984

[51] Int. Cl.⁴ .............................................. H04J 11/04
[52] U.S. Cl. ......................................... 370/58; 370/67
[58] Field of Search ................ 370/58, 67, 113, 110.1; 375/94; 179/81 B, 84 R

[56] References Cited

U.S. PATENT DOCUMENTS

| | | | |
|---|---|---|---|
| 3,860,756 | 1/1975 | Shinoi et al. | 179/81 B |
| 3,899,643 | 8/1975 | Tabalba | 179/81 B |
| 3,953,676 | 4/1976 | Brown | 179/81 B |
| 3,963,876 | 6/1976 | Holtz et al. | 179/81 B |
| 4,389,720 | 6/1983 | Baxter et al. | 370/67 |
| 4,439,639 | 3/1984 | Monter | 179/84 R |

Primary Examiner—Douglas W. Olms
Assistant Examiner—Kenneth I. Rokoff
Attorney, Agent, or Firm—Kenyon & Kenyon

[57] ABSTRACT

A station interface for a digital electronic telephone switching system is disclosed. The station interface couples a plurality of digital telephone instruments to a digital data bus having PCM encoded signals representative of analog voice signals time-division multiplexed thereon. The station interface enables two way communication between the telephone instruments and the digital data bus and includes a frame store memory for temporarily storing digital data on the data bus and assigning the digital data to system time slots. The output of the frame store memory is selectively supplied under microprocessor control to a digital audio processor which processes the PCM encoded voice signals from the telephone stations and supplies these signals to the audio processor. The audio processor digitally processes both the selected data from the frame store memory and the data from the telephone stations forwarded by a multiplexer, in respective system time slots, under microprocessor control. The PCM encoded signals are gain modified under the control of the microprocessor by the audio processor. The microprocessor monitors accumulated values of the energy of the voice signals originating at the telephone stations and those being forwarded to the telephone stations to dynamically alter the gain levels of the voice signals. In this way, differences in gain levels between signals originating from different sources, e.g. internal telephone stations or trunk lines, can be compensated. The station interface has particular application in controlling hands-free telephone station operation.

15 Claims, 31 Drawing Figures

OVERALL SYSTEM ARCHITECTURE

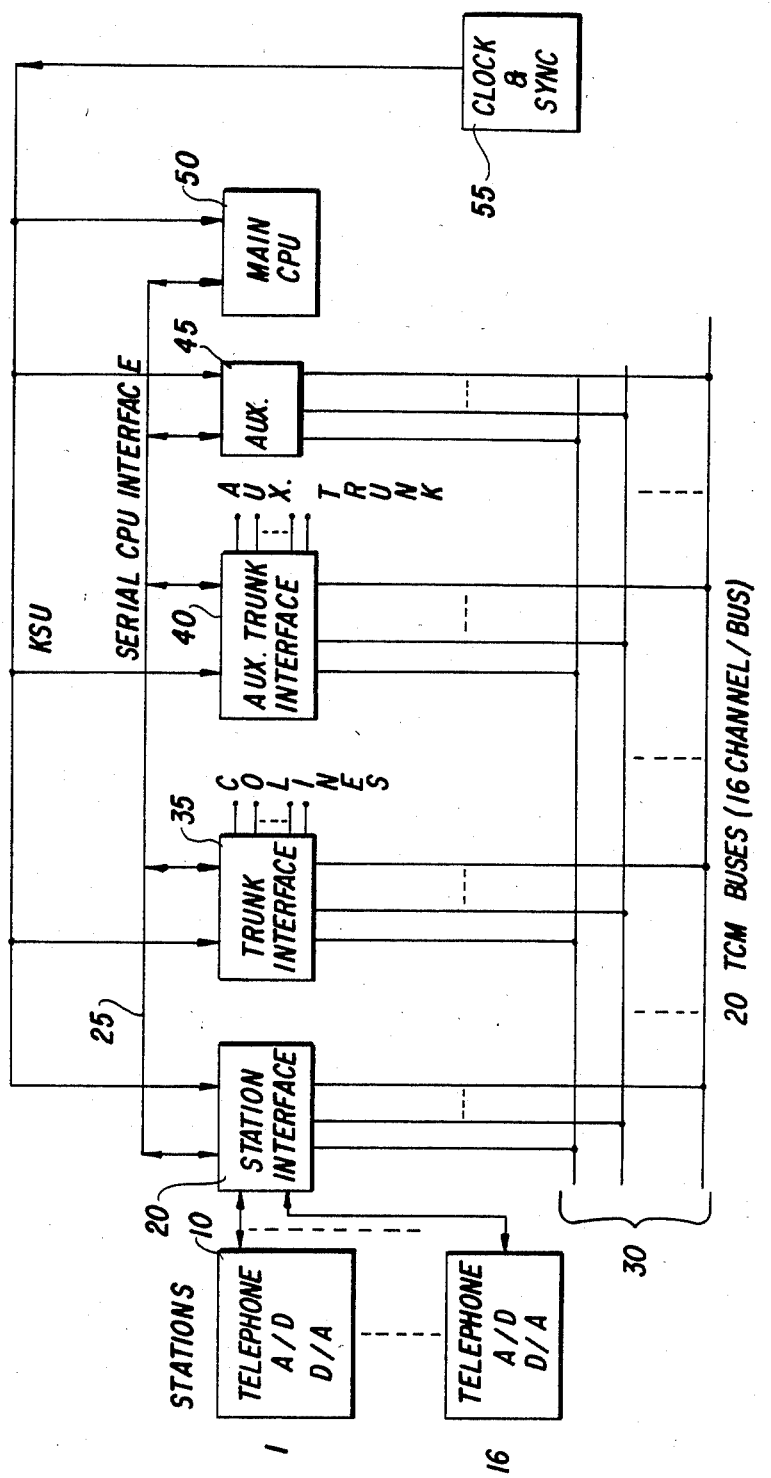

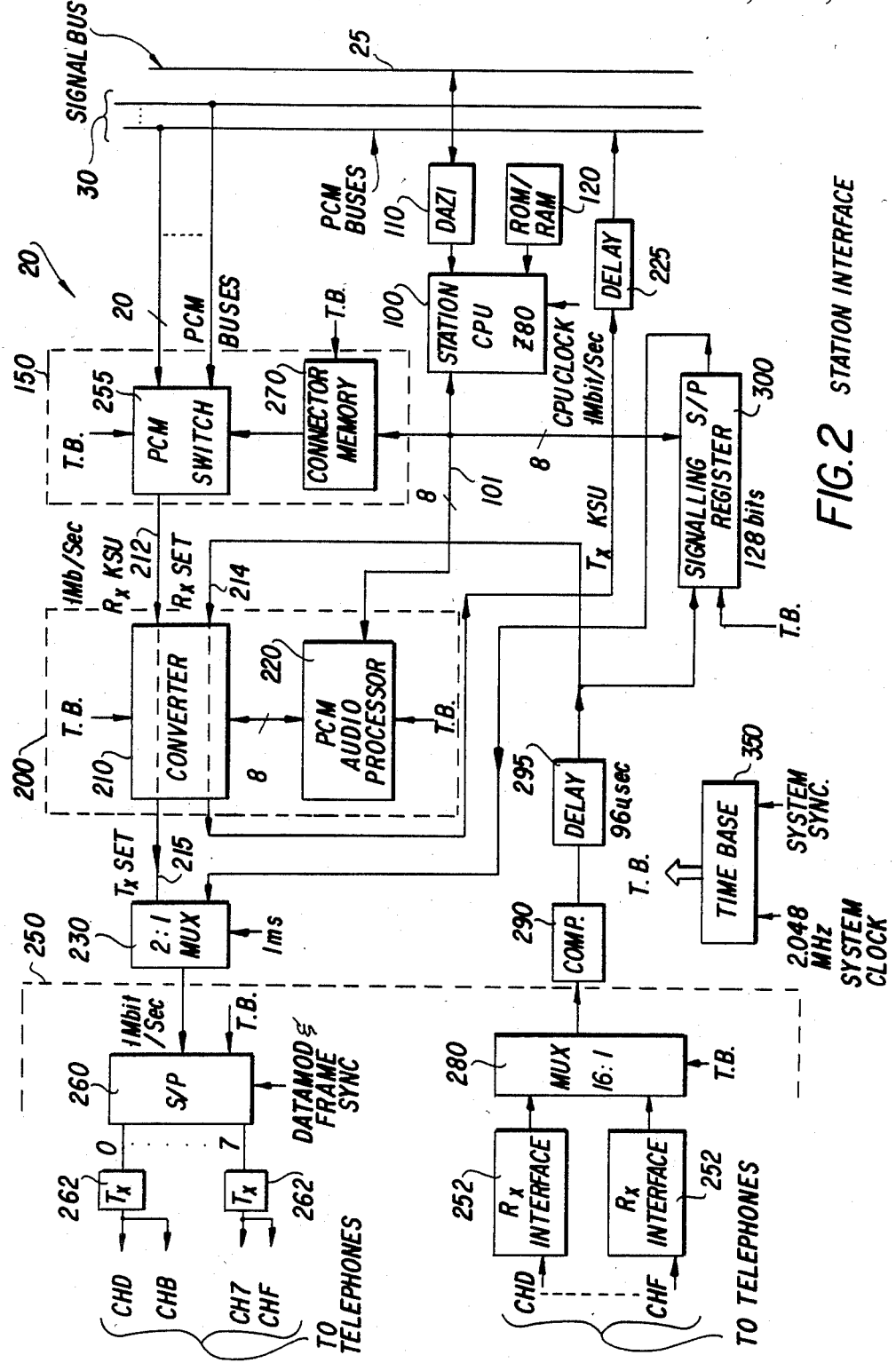
FIG. 2 STATION INTERFACE

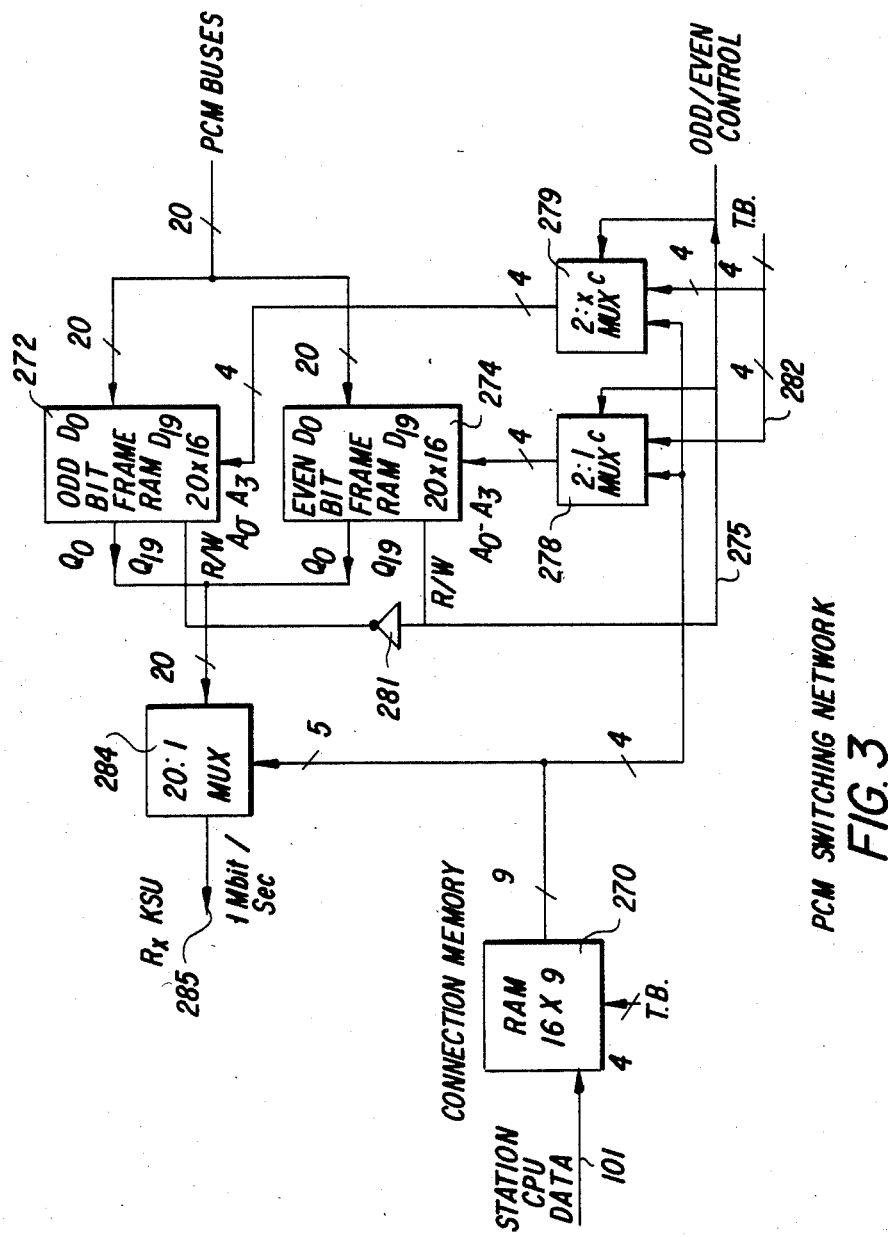

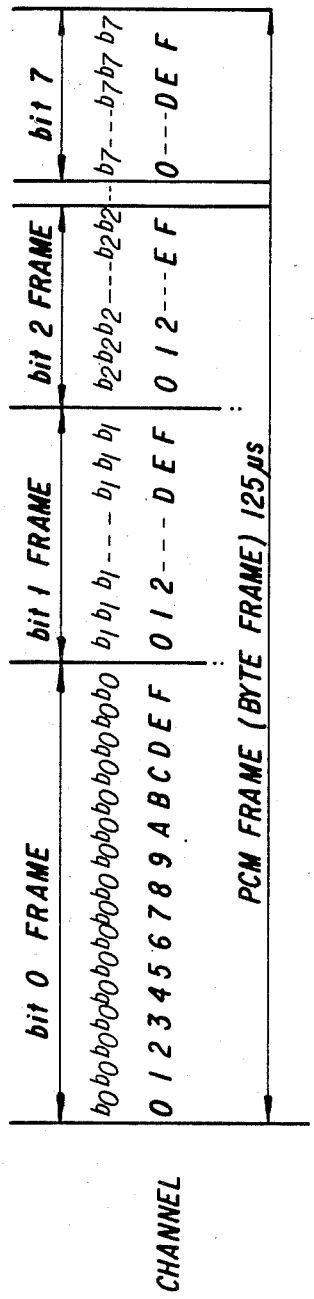
FIG. 6  FORMAT FOR 1Mbit SERIAL BIT INTERLEAVED PCM DATA

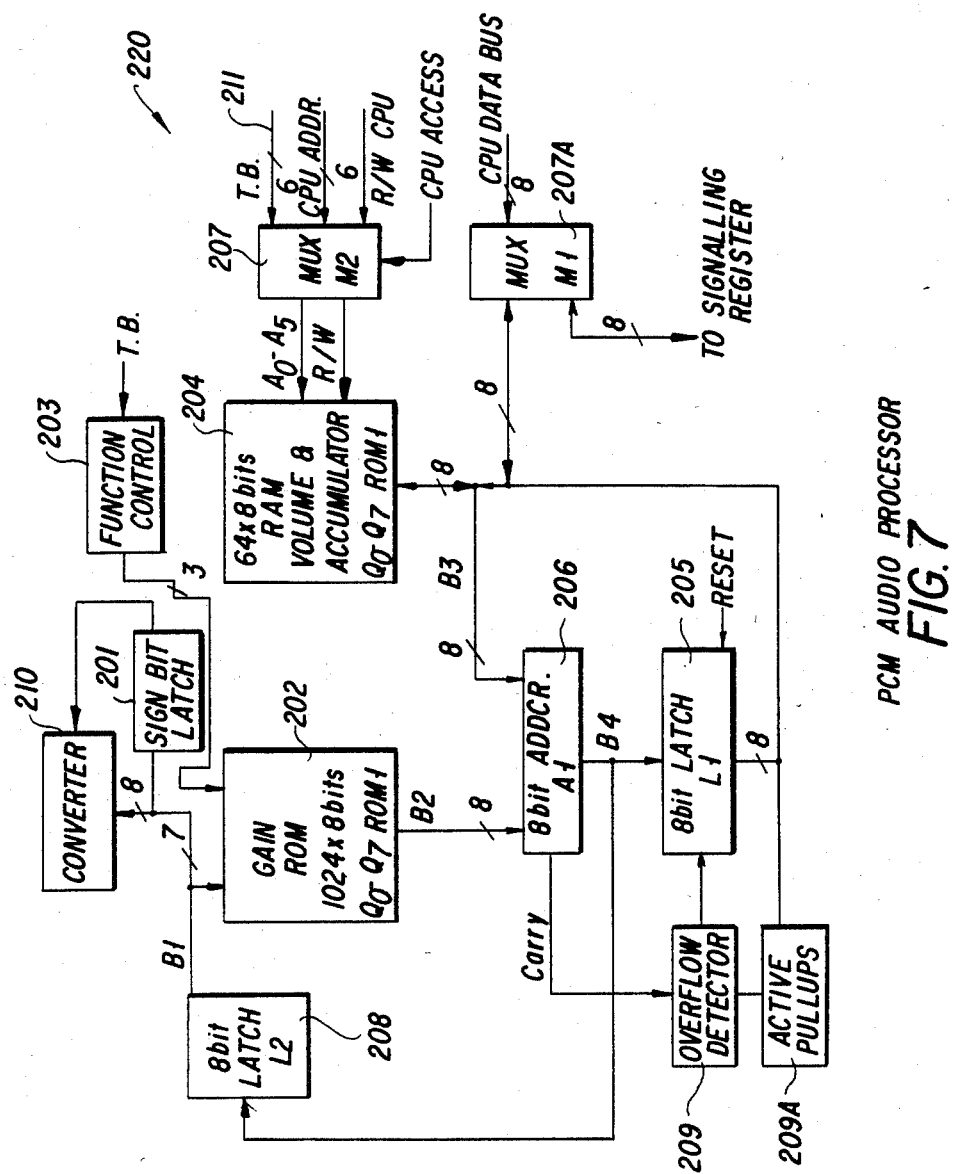
PCM AUDIO PROCESSOR FIG. 7

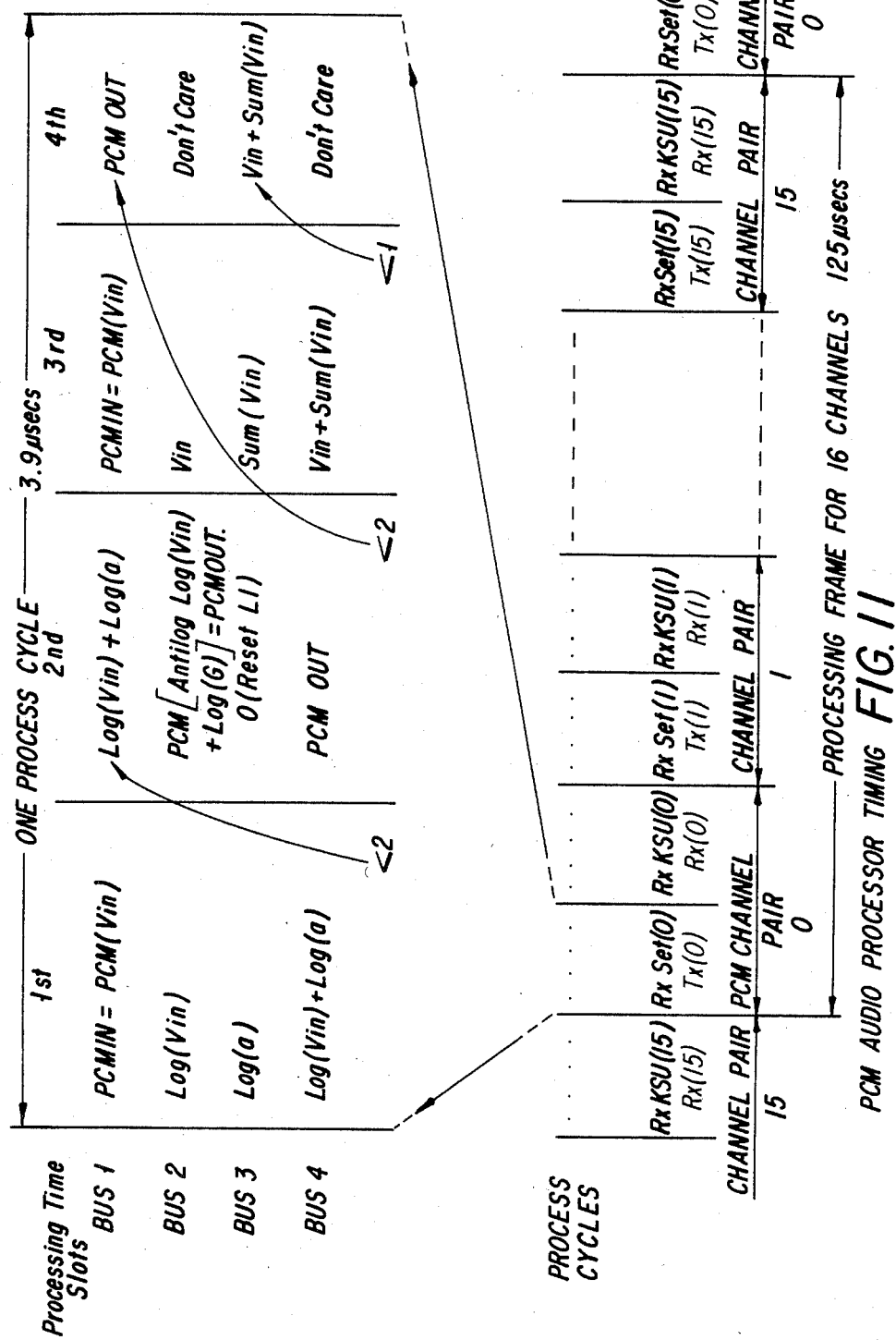
FIG. 11 PCM AUDIO PROCESSOR TIMING

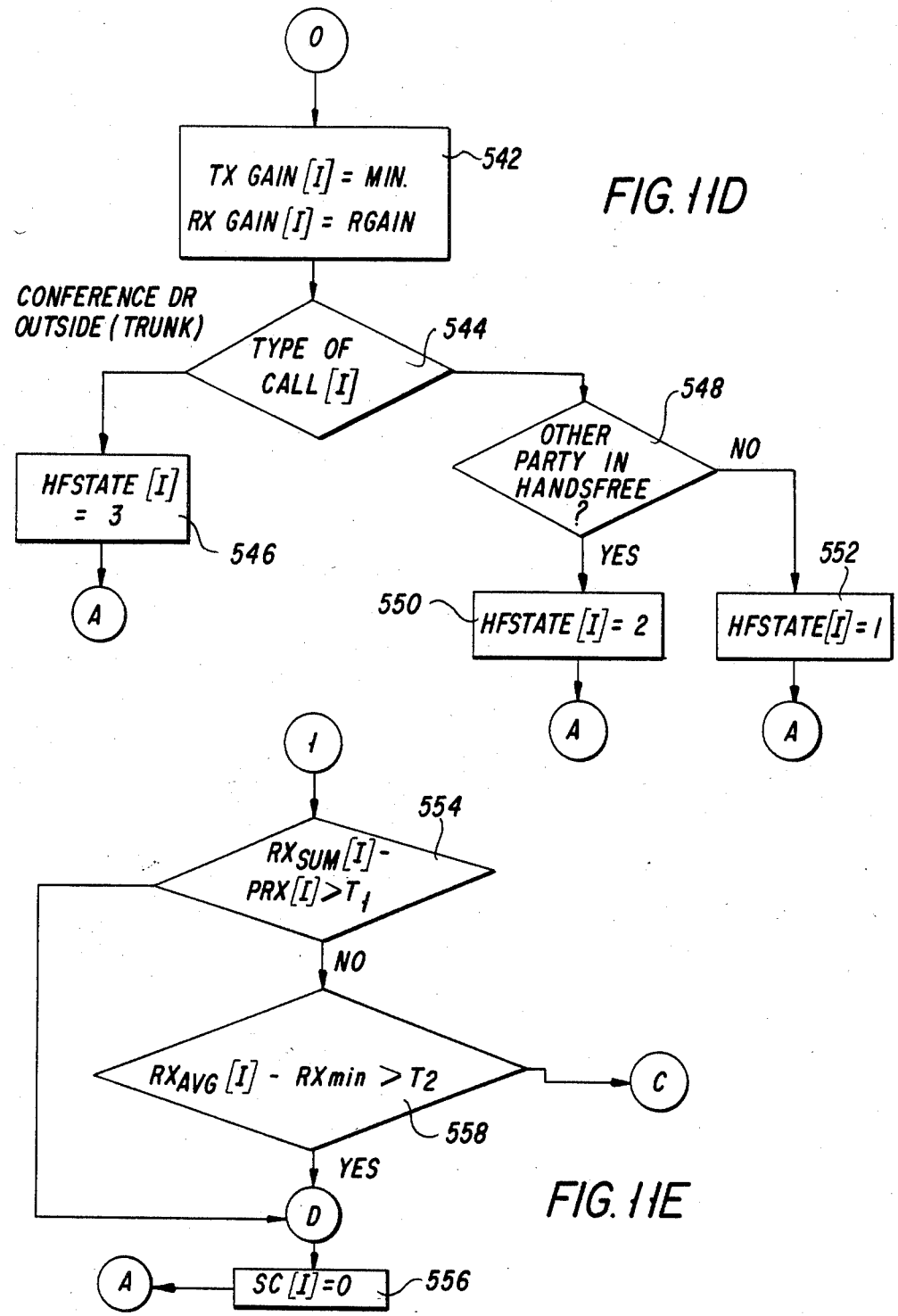

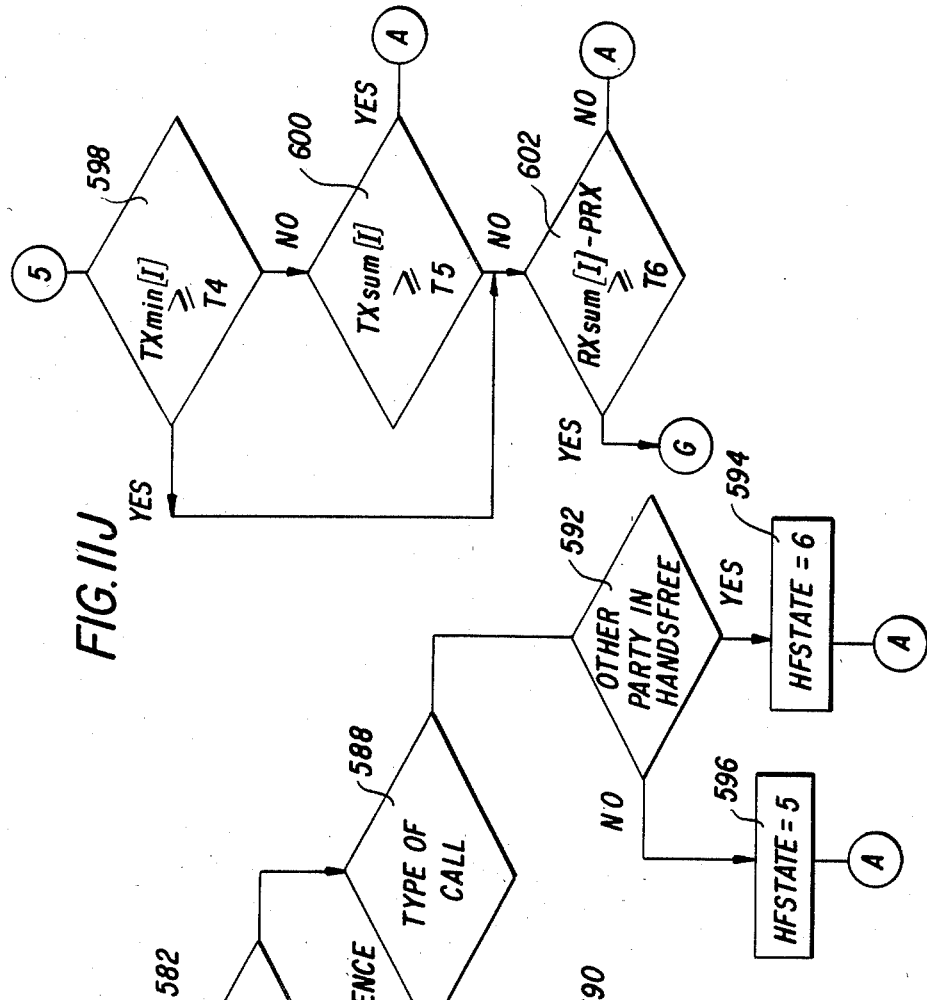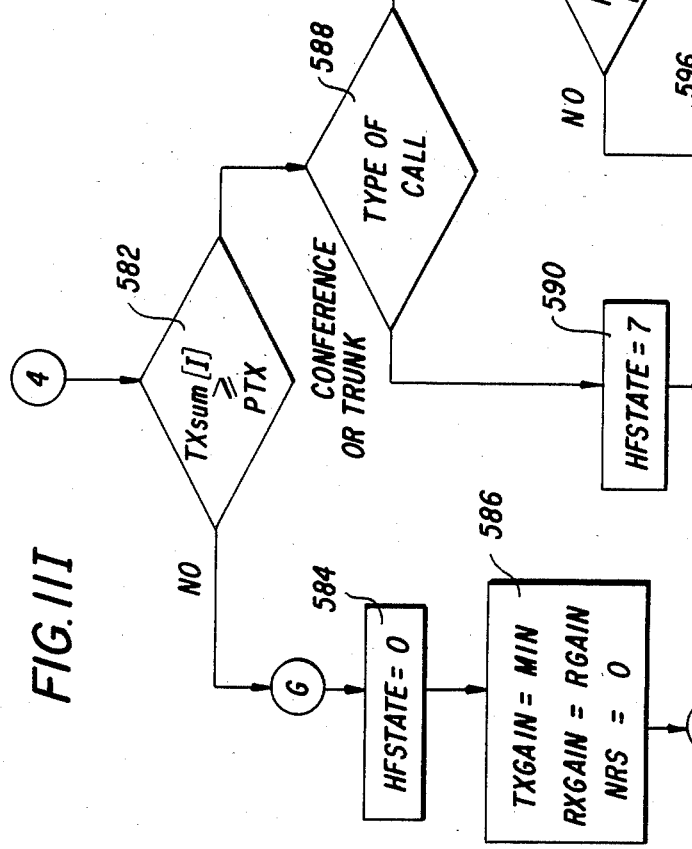
FIG.11J
FIG.11I

CONVERTER OUTPUT FORMAT AND SHIFT REGISTERS

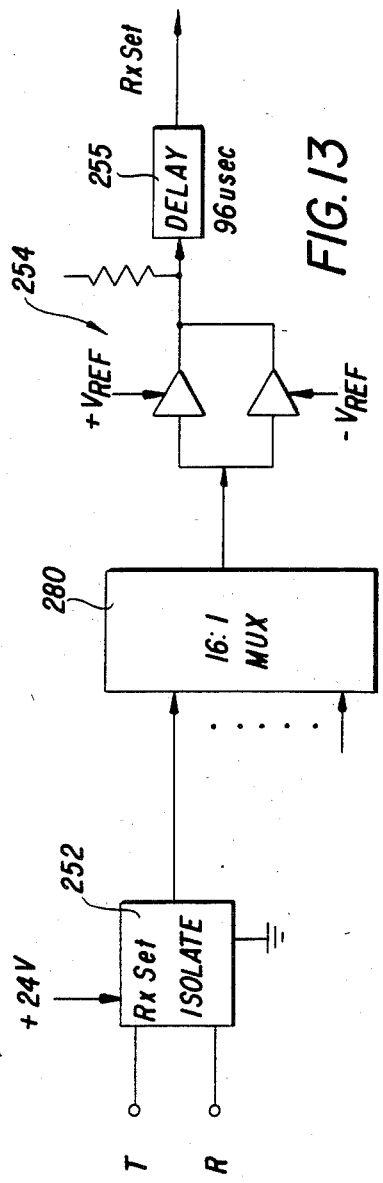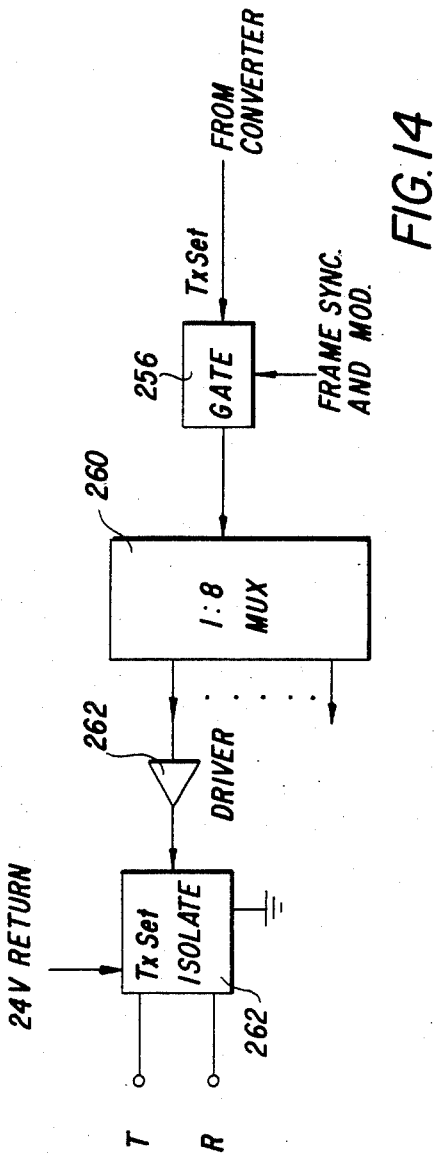

TxSET TRANSMISSION FORMAT

BiPOLAR Rx(Set) TRANSMISSION FORMAT

Tx Set PCM SIGNALLING FORMAT

STATION INTERFACE FOR DIGITAL ELECTRONIC TELEPHONE SWITCHING SYSTEM HAVING CENTRALIZED DIGITAL AUDIO PROCESSOR

BACKGROUND OF THE INVENTION

The present invention relates to digital electronic key telephone switching systems and private branch exchanges (PBX's) and more particularly, to a station interface for a digital electronic telephone switching system having a centralized digital audio processor. The present invention relates particularly to electronic key telephone systems in which voice signals are converted to digital form before they are transmitted to the central switching unit, also known as a key service unit (KSU), for retransmission to other telephones in the system or to trunk lines.

In a telephone switching system, it is necessary to modify the gains of various audio signals. These gain levels are dependent on the circuit to which a particular telephone is connected. For example, it is normal to provide a different gain setting if a telephone is connected to a central office (C.O.) trunk or lines are compared to when it is connected to another telephone inside the same system. Also, for supervisory signals like ringing tones, it is normal to provide a means to control the level of the ringing, often in the form of a volume control potentiometer or a multiposition switch located at a particular telephone.

Traditionally these gain control functions have been done on a decentralized basis, i.e., the gain controlling elements are resident in the circuitry of the individual circuit, e.g., in the telephone or in a line or trunk circuit. Because of the cost associated with this individual gain adjustment circuitry, the number of gain adjustments are kept to a minimum, thus providing acceptable performance for most conditions but not optimum transmission performance.

Another application where gain modification of audio is used is in hands-free speaker phone applications, e.g. U.S. Pat. No. 3,860,756. In this mode of telephone operation, a microphone and speaker are used as the audio transducers and, in one embodiment, a voice switching circuit is used to switch the telephone into either the receiver or the transmitting mode, depending on whether the telephone user is either listening or talking. Such function is necessary for hands-free operation in order to prevent feedback from the speaker to the microphone.

The basic principle for voice switched operation is to be able to detect which side of the communication channel is transmitting the signal and switch the voice path accordingly. Normally, some parameter that is a function of signal power is sensed and acted upon.

Speaker-phone circuits tend to be fairly complex circuits because of the complex nature of the parameters that have to be considered in the design of the circuitry. Some parameters that affect speaker phone performance are ambient background noise, speech signal levels and speech echo. Because of the wide variation in these parameters and because it is necessary to respond very quickly and accurately to changes in Receive/Transmit path switchovers, the circuits can be complex. Normally the more parameters that a circuit can monitor and take into account in the determination of switching thresholds, the better is the switching performance. However, the complexity of a circuit is proportional to its cost. This practically limits the performance of speaker-phone circuits which are provided on an individual telephone basis.

SUMMARY OF THE INVENTION

It is an object of the present invention to provide a station interface for a telephone switching system wherein voice signals which are transmitted or received by a telephone are in digital form, and wherein control of the gain of the audio signals for all telephones is done at a centralized location at the station interface.

It is a further object to provide such a station interface for a telephone switching system in which all gain adjustments are done automatically and digitally, i.e., the gain of the digitized audio signals is modified digitally.

It is yet a further object of the present invention to provide a station interface for a telephone switching system which allows the energy of voice signals to be monitored and measured, so that optimum hands-free operation can be obtained. For example, in a hands-free conversation, the energy of both the transmit and receive signals can be monitored and appropriate gain factors or attenuation can be applied to the respective signals.

The advantages of the present invention are that it results in lower cost and affords much more flexibility in the control of a plurality of audio gain levels. Cost is minimized because the same circuitry is utilized to control all audio gain functions, thus eliminating any gain controlling circuitry in the telephones, line circuits and trunk circuits. By utilizing microprocessor control, complex routines may be implemented to perform the voice switching speaker-phone function. Of considerable advantage is the fact that the present invention provides a station interface having a centralized audio processor controlled by a microprocessor which has access to system information. As a result of this access to system information, different voice switching programs, depending on which circuit a telephone is connected to, may be implemented. Each program provides optional voice switching for each particular condition. For example, different gains are required when a telephone in the hands-free mode is connected to:

(1) another internal telephone not in hands-free mode;
(2) another internal telephone in hands-free mode;
(3) a C.O. trunk, and
(4) a conference circuit.

The present invention provides a means for automatically adjusting the gains for these conditions to the optimum levels.

The present invention may also be used for other applications, one of which is in automatic call answering detection. This application is used to determine when a placed call has been answered. Newer telephone systems are capable of calculating the costs of placed calls. The problem encountered, however, by most systems, is when to start timing the call and accumulating the charges since most C.O. lines do not return any answer supervision. In most telephone systems a charge is accumulated for a call after some preset time has been exceeded, e.g., 30 seconds. This crude method introduces inaccuracies in the cost of a call, and if a call is not answered, an erroneous charge is still made. The present invention may be used to monitor a call when it is placed so that an accurate determination of when a call has been answered can be made. For example, by monitoring the energy content of the received data, it can be determined whether the received signals are speech, ring signals or busy tones.

The above objects and advantages of the present invention are achieved by apparatus in a digital electronic telephone switching system for coupling a plurality of digital telephone instruments to a digital data bus having a plurality of time division multiplexed digital data channels allotted thereon, and for enabling two way communication between selected ones of the telephone instruments and the digital data bus comprising:

means coupled to the digital data bus for temporarily storing digital data transmitted on the bus, the storing means comprising a plurality of storage locations, each storage location corresponding to a channel of the digital data bus;

first time division multiplexing means coupled to the telephone instruments for receiving a plurality of first signals from the telephone instruments and for converting the first signals into a first time-division multiplexed serial signal;

second time-division multiplexing means coupled to the telephone instruments for receiving a second serial signal having digital data for each of the telephone instruments time-division multiplexed thereon and for converting the digital data of the second serial signal into a plurality of parallel serial data streams for each of the telephone instruments;

control means including computer means coupled to the storing means for successively selecting desired ones of the plurality of storage locations, thereby providing a serial selected digital data signal from the storing means; and processing means coupled to the storing means, the digital data bus and the first and second time division multiplexing means for digitally processing the selected digital data signal from the storing means and the first serial signal so as to modify the digital representation of the amplitude of voltage levels represented by the selected digital data signal and the first serial signal and to produce a modified selected digital data signal and a modified first serial signal, the modified selected digital data signal being coupled to the second time-division multiplexing means as the second serial signal and the modified first serial signal being coupled to the digital data bus.

BRIEF DESCRIPTION OF THE DRAWINGS

The invention will be described in greater detail in the following detailed description with reference to the drawings, in which:

FIG. 1 is a block diagram of a digital electronic key telephone switching system in which the station interface of the present invention is employed;

FIG. 2 is a detailed block diagram of the station interface of FIG. 1;

FIG. 3 is a detailed block diagram of a portion of FIG. 2, specifically, the blocks labeled PCM switch and connection memory in FIG. 2;

FIG. 6 is a diagram of the data format of the PCM serial data at certain points in the block diagram of FIGS. 1 and 3;

FIG. 7 is a detailed block diagram of the digital audio processor of FIG. 3;

FIG. 11 is a timing diagram illustrating the operation of the audio processor of FIG. 7;

FIGS. 11A-11L combined are a flowchart for the program resident in the program memory of the station CPU for controlling the operation of the audio processor of FIG. 7;

FIG. 13 is a block diagram of the digital interface between the telephone and the station interface of the present invention for data originating from the telephone stations and transmitted to the KSU;

FIG. 14 is a block diagram of the digital interface between the telephone and the station interface for data originating from the KSU and transmitted to the telephone stations;

DETAILED DESCRIPTION

Figure 5:
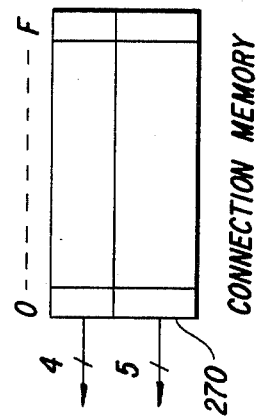
FIG. 5 is a schematic illustration of the connection memory of FIG. 3.

With reference now to the drawings, FIG. 1 shows the overall system architecture of a digital electronic key telephone system employing the station interface of the present invention. In the embodiment illustrated, 16 digital key telephone sets 10, having appropriate A/D and D/A converters, are coupled to the station interface circuitry 20 of the central key service unit or KSU. The station interface is coupled to a serial CPU interface 25 and a plurality, in the illustrated embodiment 20, of pulse code modulated (PCM) digital buses 30. Further coupled to the PCM buses 30 and the serial CPU interface 25 are a trunk interface 35 which is coupled to the central office lines, an auxiliary trunk interface 40 which interfaces with various other analog trunks such as TIE lines, Direct Inward Dial (DID) lines and E and M lines, for example. An auxiliary block 45 comprises circuitry such as DTMF (Dual Tone-Multifrequency) receivers, modem circuitry and conferencing circuitry, for example. A main CPU 50 controls operation of the KSU via the serial CPU interface 25.

In the embodiment illustrated, each of the 20 PCM buses has 16 channels time division multiplexed on the bus, for a total of 320 channels on all 20 buses. Control of all timing is accomplished via system clock and synchronization circuitry 55 which controls main CPU timing, and via time base generators in other parts of the system which operate from the system clock 55.

Although only one station interface, travels interface and auxiliary trunk interface are shown, there can, of course, be a number of such components in a typical expanded system.

FIG. 2 is a detailed block diagram of the organization of the station interface 20. The station interface comprises four main circuit functions, a local station CPU 100, a PCM switching network 150, PCM audio processing circuitry 200 and digital interface 250. The station interface also includes several additional components including control signalling register 300 under station CPU 100 control and a time base generator 350 operating from the main system 2.048 MHz clock and system synchronization circuitry. The system clock rate may hereinafter be referred to as being 1 MHz, for simplicity. Time base generator 350 comprises a plurality of counters for generating various control signals at appropriate times. Time base generator 350 provides 16 50% duty cycle frequencies from 1.024 MHz to 31.25 Hz. Frame synchronization is defined as one edge of the main system clock every 32 msec.

The station CPU 100 preferably comprises a Z80 8 bit microprocessor manufactured by Zilog Corp. Station CPU 100 communicates to the main CPU 50 via a dual channel asynchronous receiver/transmitter (DART) 110. DART 110 couples serial control data from the serial CPU signal bus 25. The function of the station CPU 100 is to respond to instructions from main CPU 50 and to provide local control functions such as PCM channel connections, maintain control signalling with the digital telephones and control gain levels of the audio processor circuitry. Software for controlling audio processing is disposed on ROM/RAM 120 and will be described in more detail below.

The PCM switching network 150 comprises a bit interleaved space/time PCM Switch 255 and connection memory 270. The input to the PCM switch 255 comprises the 20 PCM buses carrying 16 time multiplexed channels. Each bus carries PCM data at a rate of 1.024 M bit/sec. (hereinafter referred to as 1 M bit/s for simplicity). The data format of the PCM signals is shown in FIG. 6 and will be described in more detail later. Under the control of the station CPU 100, the output of the PCM switch 255 provides one serial 1 M bit/sec. output bus comprising any 16 channels selected in the system. The output of PCM switch 255 is fed to audio processing circuitry 200.

The audio processing circuitry 200 provides PCM gain modification functions. The audio processing circuitry accepts two serial 1 M bit/sec. data streams of serial bit interleaved PCM data (Signals from the PCM buses, RxKSU, and signals from the digital telephones, RxSet) and first converts this data into a parallel byte format via converter 210. Each PCM byte represents the amplitude of a speech sample. The audio processor 220 modified the parallel PCM byte coding under the instructions of the station CPU 100 and thus rovides a centralized PCM gain control function for both transmit and receive for any 16 channels. In addition, the audio processor 220 codes the PCM byte into a linear code representing the amplitude of the PCM code and accumulates the linear codes over a constant time interval. This accumulated value is proportional to the power content of the speech signal. The station CPU 100 at certain intervals reads the accumulated values and by comparing the values for the receive and transmit of one channel can dynamically control the receive and transmit gains in order to perform a centralized hands-free switching function, for instance.

After PCM code modification, the modified PCM byte is fed back into converter 210 where the parallel byte is reconverted into a serial 1 M bit/sec. bit interleaved data stream.

The reconverted gain modified PCM data (Tx Set) is then coupled to 2:1 multiplexer 230 where control data for the telephone is interleaved every 1 ms. The serial output is then fed to the digital transmit interface circuitry, which includes a serial to parallel converter 260. By a unique codingg scheme, described in a copending application entitled DUAL CHANNEL TRANSMISSION METHOD AND APPARATUS WITH INHERENT CHANNEL IDENTIFICATION AND EXTRACTION, filed Apr. 3, 1984 in the name of Vincent Viacheslav Korsky, the disclosure of which is hereby incorporated by reference, two telephone sets can be coupled to one data transmission path. For example, telephone sets 0 and 8 share a common data path. Similarly the telephones coupled to channels 7 and F share a common data path.

The digital receive interface circuitry includes a 16:1 analog multiplexer 280 which is time-base controlled to sequentially scan the 16 input channels from the telephone stations. Its output is sensed for magnitude swings by comparator 290, delayed for timing alignment by delay stage 295 and fed to both the audio processing circuitry 200 and signalling register 300 which accumulates the 1 bit/millisecond control data from 16 telephone sets (channels O thru F). This information is read by the CPU 100 every 8 milliseconds or 4 times per signalling frame via CPU data bus 101. After the CPU reads all 16 words from the 16 telephones, it writes control information to the signalling register which routes this control data to 2:1 multiplexer 230 where the data is combined with the digital audio data from the audio processing circuitry 200 and demultiplexed into eight transmit data modulated ports by serial to parallel converter 260. The operation of the signalling register, which is thus used for both forwarding control information to the telephone sets and for receiving control information from the telephone sets, and the operation of the transmit and receive interface circuitry will be described in more detail below.

Data received from the telephone sets is also coupled to audio processing circuitry 200 (RxSet), where the gains of the audio signals from the telephone sets are modified. The gain modified signals are then coupled to one of the PCM buses after an appropriate delay 225 to synchronize the data with the buses. The data is then routed by the PCM bus under main CPU 50 control either to PCM switch 255 for transmission to another station on the same station interface, to another station interface, to trunk interface 35 for transmission over a C.O. line or to auxiliary trunk interface 40 for transmission over auxiliary trunks.

The operation of PCM switching circuitry 150 may now be explained in more detail. With reference to FIG. 3, the switching network includes connection memory 270 which is organized as a 16 word×9 bit RAM. Station CPU 100 writes data into connection memory 270 via data bus 101 so that the apropriate channels from the PCM buses are placed in proper serial order, i.e., the PCM data from the appropriate channel on the PCM bus is forwarded to the audio processing circuitry at the proper time so that it is received by the correct telephone station. The operation of connection memory 270 will be explained in greater detail later.

Figure 4:
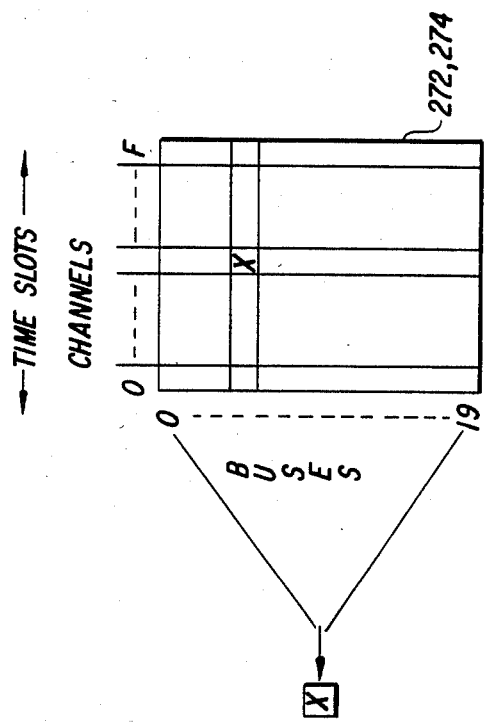
FIG. 4 is a schematic illustration of the odd-even memories shown in FIG. 3.
Figure 9:
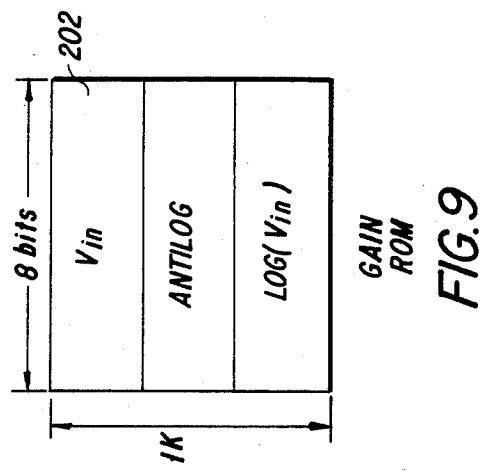
FIG. 9 is a schematic illustration of the GAIN ROM of FIG. 7.
Figure 8:
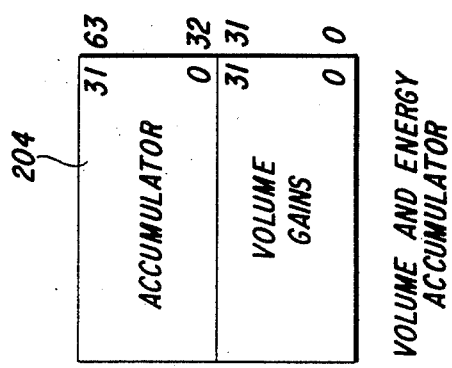
FIG. 8 is a schematic illustration of the volume and energy accumulator RAM of FIG. 7.

The PCM switching network further comprises two sections of RAM, an odd bit frame RAM 272 and an even bit frame RAM 274. Each RAM section is organized as 16 words of 20 bits. The input data to the RAMs are the 20 parallel PCM buses, the format of which is shown in greater detail in FIG. 6. As shown in FIG. 6, the data is bit interleaved. Each PCM byte frame comprises 8 bit frames extending for 125 usec. Each bit frame, from bit from 0 to bit frame 7, contains the corresponding bits from each PCM sample for all 16 channels on the bus. Thus, bit frame 0 contains the $b_0$ bits for all 16 channels, bit frame 1 contains the $b_1$ bits for all 16 channels, etc. The odd and even bit frame RAMS alternate in function, i.e., while data is being written into one RAM, data is read from the other RAM. Thus while the odd bit frame PCM bit for all 20 buses are being written into the odd bit frame RAM, the even bits for all 20 buses are being read from the even bit frame RAM one bit at a time. In the next bit frame, the even PCM bits are written into the even bit frame RAM and the odd bits are read from the odd bit frame RAM one bit at a time. Data is written into the RAMS under the address control from the time base 350 so that the data from each PCM channel is always written into its own corresponding address, i.e., channel O is written into address O, etc. This is shown graphically in FIG. 4, which illustrates that each channel is written into a corresponding "time slot" of the memory.

As shown in FIG. 3, a control line 275 from station CPU 100 controls the operation of two multiplexers 278 and 279, which select the appropriate even and odd memories, respectively, into which data is being written from the 20 PCM buses. This control line is also coupled to the Read/Write inputs of the two memories. An inverter 281 is provided so that when one memory is being written into, data is being read from the other memory. A four bit line 282 from the time base generator controls the address into which data is written.

Reading of PCM data from the memories 272 and 274 is under the address control of the address stored in the connection memory 270. The addresses stored in connection memory 270 are written into the memory by station CPU 100. During each of the 16 channel time slots the connection memory outputs a 9 bit address, 4 bits for the RAMS so as to select one of the sixteen time slots and 5 bits to multiplexer 284 to select one of the 20 outputs (buses) of each RAM at any particular time. Thus, on output line 285 there is a 1 M bit/sec. PCM data stream consisting of 16 PCM channels and each channel can be any of the 320 PCM channels available to the PCM switching network, thereby implementing a nonblocking switching matrix. As shown in FIG. 5, the connection memory 270 is organized as 16 words of 9 bits, one word for each channel. In each of the 16 address locations, one location for each corresponding telephone channel, a termination address to select one of the 320 system time slots is stored. When the connection memory 270 is addressed by the time base generator 350, the termination address is read and in turn addresses the selected ODD or EVEN bit frame RAM and the bus multiplexer 284 to select one of the 320 system time slots. Accordingly, the data at the selected location in the ODD/EVEN bit frame RAM is placed at the output of multiplexer 284 at the proper time so it is connected to the correct telephone station. The appropriate termination addresses are written into the connection memory for each of the 16 telephone channels by station CPU 100.

The structure illustrated for the switching network 150 provides many advantages. For example, to implement a system paging function, all telephone stations will be connected to the same channel, i.e., all telephone stations are connected to the same "time slot" of the ODD/EVEN bit frame memories. Accordingly, CPU 100 writes the same location in all 16 addresses of connection memory 270 in order to implement a paging function. This design therefore results in a great saving in hardware design and circuitry, since special functions can be implemented by software alone.

Another advantage is in the area of DTMF generators. Instead of having analog DTMF generators, digitized tones stored in main CPU memory can be coupled to the appropriate time slots of the digital PCM buses. The tones can then be selected by choosing the appropriate time slots in the ODD/EVEN bit frame memories. Similar techniques can also be aplied for other supervisory signals, such as ring, dial and busy tones.

Serial data at 1 M bits/sec. is fed from multiplexer 284 to the audio processing circuitry 200. The PCM data first enters converter 210, which serves the dual purposes of converting the serial PCM data into a parallel format for use by PCM audio processor 220 and reconverting the PCM data after processing by audio processor 220 back into serial format.

Figure 10:
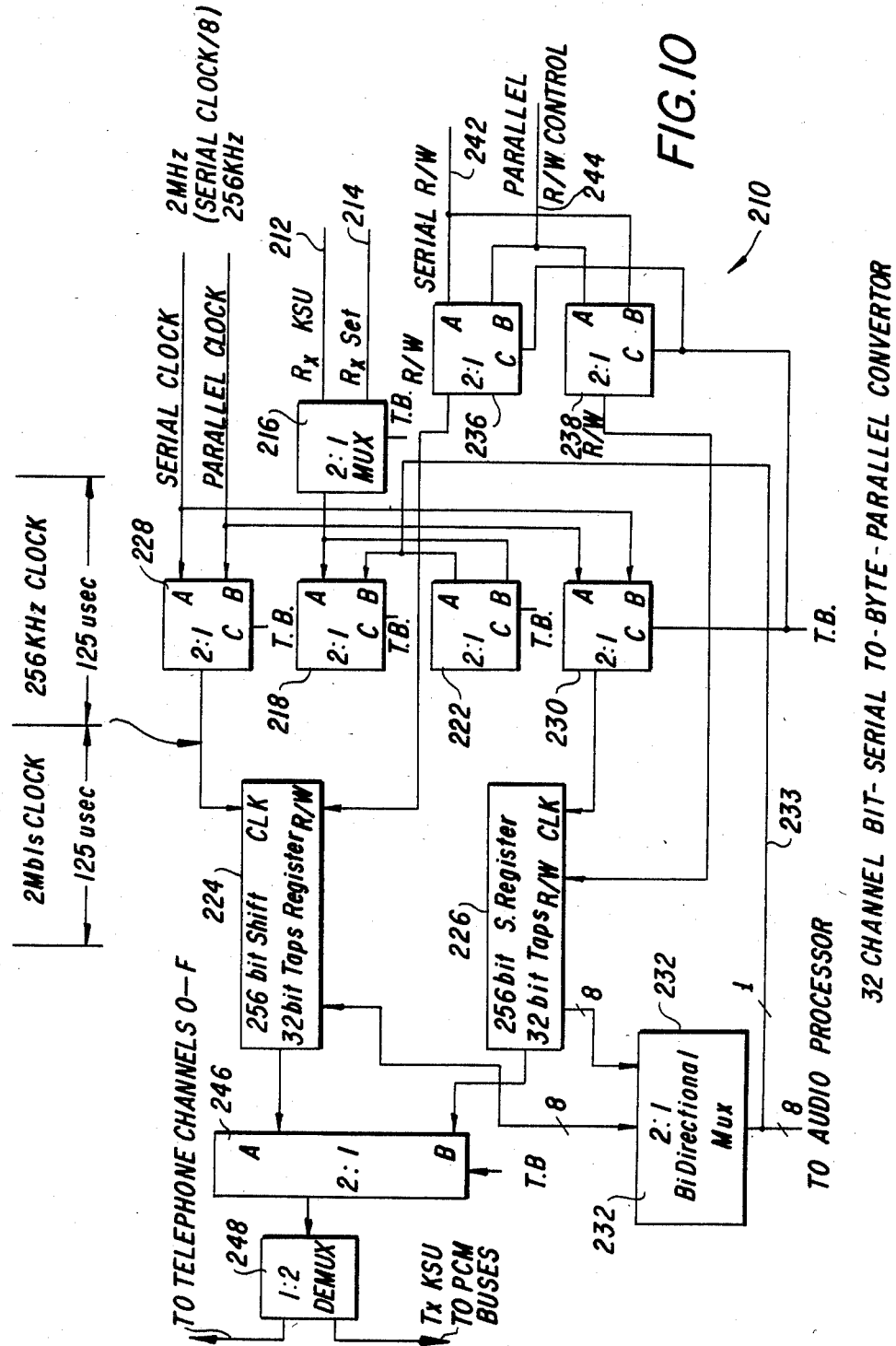
FIG. 10 is a detailed block diagram of the converter of FIG. 2.
Figure 12:
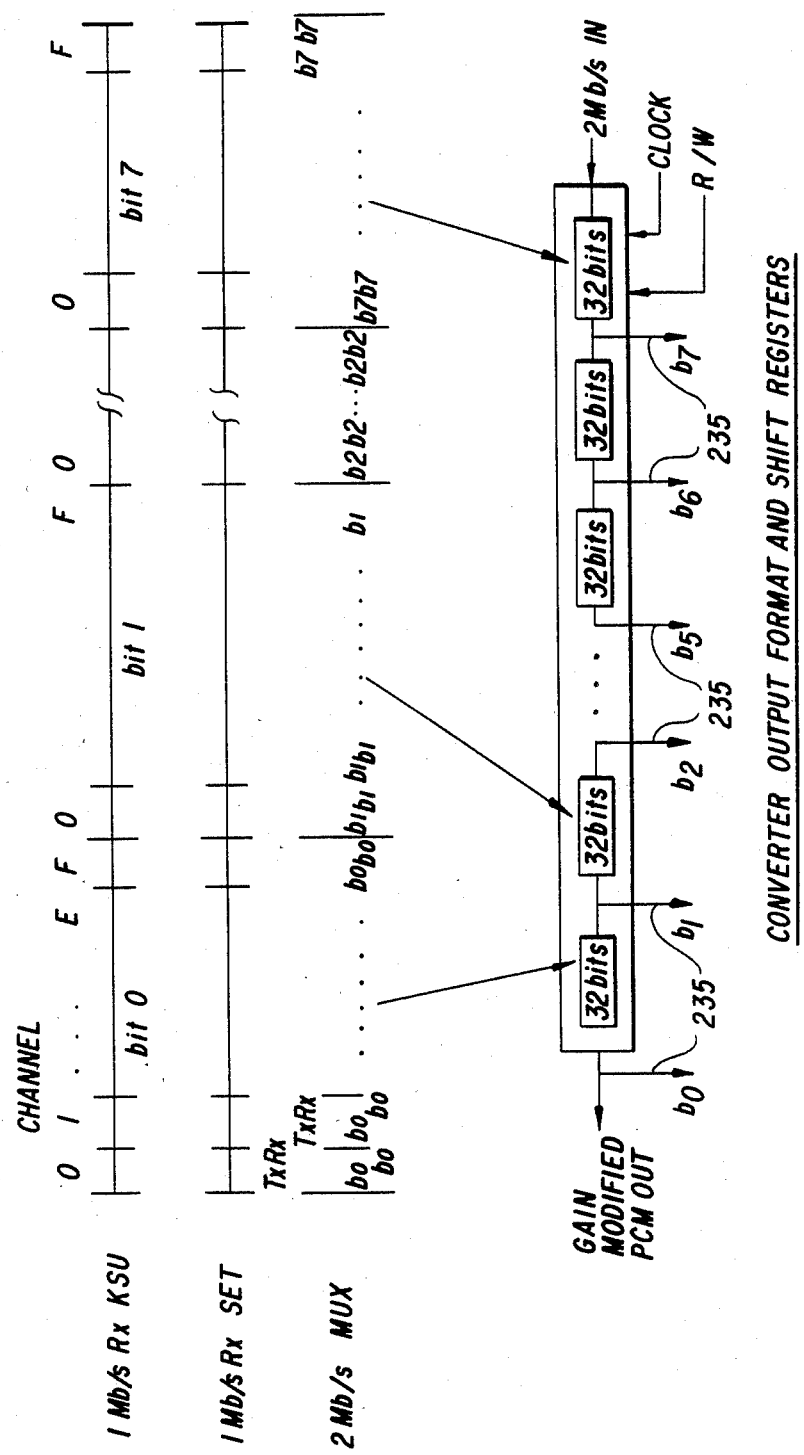
FIG. 12 is a diagram illustrating the data format of the serial data in various portions of the converter of FIG. 10 and also showing the shift register structure of the converter.

With reference to FIG. 10, the block diagram of the converter is there shown. The converter receives PCM data from multiplexer 284 (RxKSU) at 212. PCM data from the telephones is received at 214 (RxSet). A first multiplexer 216 under control of time base generator 350 multiplexes the PCM data from the KSU and the data from the telephones. The inputs and output of multiplexer 216 are shown in the upper part of FIG. 12. As shown, the corresponding KSU and station bits for each channel are transmitted after multiplexing adjacent to each other in the time slot previously alotted to one bit. The 2 M bit/sec. serial stream is then fed via two multiplexers 218 and 222 to two 256 bit shaft registers 224 and 226. Each of these shift registers is organized into 8-32 bit registers, with taps at each 32nd bit, as shown in the lower portion of FIG. 12. Multiplexers 218 and 222 are utilized to select either the data from multiplexer 216 or a portion of the data from the audio processor 220, as will be explained in more detail later. Furthermore, multiplexers 218 and 222 alternately forward data from multiplexer 216 to one of the two shift registers. When 256 bits of data (1 byte frame for both transmit and receive data) are fed into one shift register, it is stopped and data is then clocked into the other shift register. Clocking of the shift registers during serial write-in is controlled by multiplexers 228 and 230 which select during those intervals which data is to be written into a shift register the 2 MHz system clock. During those intervals when serial data is not read into a shift register, the shift register is clocked at one-eighth the system clock rate, or 256 KHz. At the same time, the shift register goes into a parallel mode. In this way, 16 bytes of 8 parallel bits, alternately for the transmitted and received data representing 32 analog audio samples (16 bytes of RxKSU and 16 bytes of RxSet), are shifted out of each shift register in turn to bi-directional multiplexer 232 and then to audio processor 220. This is accomplished by the eight taps 235 of the shift registers, as shown in FIG. 12. The operation of the audio processor 220 will be explained in greater detail below. At this point, however, suffice it to say that the purpose of the converter 210 is to generate 8 bit PCM samples of the audio information present on the data buses. Since both tranmit and receive data are interleaved as shown in FIG. 12, the bits for each eight bit sample can be found in time every 32nd bit. Thus the reason for the shift register taps every 32 bits.

Once the PCM data is processed by the audio processor 220, it is fed back to bi-directional multiplexer 232. At this point in time, one of the shift registers 224,226 is selected to be written into, and the data from the bi-directional multiplexer 232 is written in parallel form into the selected shift register. Because the 8 shift register taps appear at the output of the shift register, 1 bit from each sample must be written into the shift registers via line 233. The remaining seven bits are then fed by the multiplexer 232 into the parallel taps of the shift registers shifted by one bit to the right. The other shift register is in serial mode, so that new PCM data is being shifted in while the modified PCM data is read out to multiplexer 246.

Whether data is written into or read out of the shift registers is determined by multiplexers 236 and 238. Two control lines 242 and 244 select, respectively, serial read/write and parallel read/write control signals. When in the serial mode, data is either written into or read out of the selected shift register while the shift register is clocked at the system clock rate (2.048 MHz) so as to shift data into and out of the register, i.e., as data is written into the register, data processed by audio processor 220 is being read out to the left. The operation of the shift registers is alternated, so that when shift register 224 is in serial mode (data being shifted through the register) shift register 226 is in parallel mode (data alternately being read out of and written into the eight parallel taps of the shift register). As will be explained in more detail below, audio processor 220 processes each 8 bit parallel byte in approximately 3.9 usecs., including reading from the shift register and writing back to it. All 32 channels can therefore be processed in 32×3.9 usecs=125 usecs. Multiplexer 246 is provided to place the alternating serial outputs of shift registers 224 and 226 into a single channel TDM form. The serial output of multiplexer 246 is coupled to a demultiplexer 248 which separates the data to be transmitted to the telephones from the data from the telephones to be forwarded to the PCM buses of the KSU for routing to either outside lines or other stations in the system.

The operation of PCM audio processor 220 may now be explained, with reference particularly to FIGS. 7, 8, 9 and 11. As shown in FIG. 7, PCM audio processor 220 comprises a GAIN ROM 202 organized as 1K words of 8 bits into which are stored values corresponding to the logarithms, antilogarithms and amplitudes of the PCM data which address the GAIN ROM at various times during the operation of the audio processor. The structure of GAIN ROM 202 is shown graphically in FIG. 9.

Audio processor 220 also comprises a volume and energy accumulator RAM 204, organized as 64 words of 8 bits. RAM 204 is used to store gain values calculated by programs resident in ROM/RAM 120 and to accumulate values obtained during the audio processor cycle. The organization of RAM 204 is shown graphically in FIG. 8.

The PCM audio processor 220 basically performs two functions, a multiplication function and an accumulation function. Multiplication of two variables is done by taking the log of both variables, summing the logs and then taking the antilog to produce a product of the two input variables. The second function that the audio processor 220 performs is an accumulation function. In this process the incoming companded PCM word is first decoded into a linear code and then added to the contents of the volume RAM location corresponding to its channel. The sum is then written back into that same location. Thus in each location the sum of the linear values corresponding to the PCM samples is accumulated. Since 32 channels of data must be processed by the audio processor (16 transmit and 16 receive) without noticeable user quality degradation, all processing must be done in real time. The operation of the audio processor will be described in more detail below.

Audio processor 220 services 16 channel pairs, 16 receive (RxSet) and 16 transmit (RxKSU) channels. Four approximately 1 usec time slots (actually 125 usec/32/4+0.975 usecs) are required to process one channel, as shown in FIG. 11. Therefore, in order to service 32 channels, a total of 128 slots are required, corresponding to 125 usec, which is the repetition rate for the PCM audio sampled at 8 KHz. (See FIG. 6.) Associated with each half of the digital audio processor's 3.9 usec processing cycle is a unique 6 bit address count 211 generated by the time base 350. This address count is used to sequentially provide the addresses for locations in volume RAM 204 via multiplexer 207. Under control of CPU 100, a volume gain byte is written into the volume RAM 204 locations that correspond to each of the 32 channels via multiplexer 207A. An additional 32 locations in the volume RAM are used to store the accumulated sums of the incoming PCM samples. This is shown graphically in FIG. 8.

With reference to FIGS. 7 and 11, the output of the bit/byte converter 210 is an 8 bit byte which is coded in u255 PCM coding representing one sample voltage of an audio signal (VIN). In the first time slot period, the PCM word addresses GAIN ROM 202 and is decoded by the GAIN ROM to produce an 8 bit output which is proportional to the log of the linear equivalent of the PCM word (log VIN). This 8 bit word is present on bus B2. During the same time RAM 204 outputs an 8 bit word which is logarithmically proportional to a multiplying factor for the PCM word (log (G)). This value is obtained from the system software. These two words are then added by a 8 bit adder 206 to produce a summed output (log (VIN)+log (G)) present on bus B4. This output, which is the sum of two log values, is latched into a 8 bit latch 208. During the second time slot period, the output of latch 208 log (VIN)+log (G) is presented to the address inputs of ROM 202. Function control circuit 203 switches ROM 202 through control of address bits $A_7$–$A_9$ so that ROM 202 produces an antilog function. The output of ROM 202 is a PCM coded equivalent word that is the antilog [log (VIN)-+log (G)] or VIN×G. At the same time, RAM 204 is disabled and 8 bit latch 205 is enabled and reset so that the 8 bit adder 206 adds all zeros to the output of ROM 202 and the output of ROM 202 remains unmodified by adder 206. The output of adder 206 is latched in latch 208 and stored. In the third time slot period the original PCM word from converter 210 is read for a second time and ROM 202 is switched to a linear decoding mode. In this mode ROM 202 decodes the input PCM word into a quantized linear representation of the PCM sample, VIN. RAM 204 is enabled and the contents of the accumulator location are read by station CPU 100 via multiplexer 207A. Adder 206 adds the present value from ROM 202 to the accumulated sum from RAM 204. The output of adder 206 which is now the new accumulated sum is latched into latch 205. If an overflow condition occurs, the carry bit is latched into the overflow detector 209, forcing 8 bit latch 205 to an all one's condition via active pullups 209A. In the fourth time slot the output of latch 205 is written into RAM 204 and replaces the previous accumulated sum with the new accumulated sum. If, however, an overflow condition had occurred and the overflow detector is set, the latch 205 output is disabled and all ouputs are set to an all one's condition by the active pullup circuit 209A, which corresponds to the maximum value which could be stored by the accumulator. At the same time in the fourth time slot period, the contents of latch 208, which is the modified PCM word, is written into the bit/byte converter 210 and replaces the original PCM word. Because the audio processor 220 operates only on magnitudes, the sign bit of the PCM word from converter 210 is stored in sign bit latch 201. When the modified PCM word is written back to the converter, the sign bit is restored. Thus four time slot periods (approximately 3.9 usecs) are used to complete the audio processing for one channel. This cycle is repeated for each of the 32 channels for a total of 128 time slots in 125 microseconds. Station CPU 100 has the capability to access the audio processor 210 in every fourth time slot via multiplexers 207 and 207A. When the CPU addresses the audio processor 210, the CPU address lines and Read/Write control line are switched to RAM 204 by multiplexer 207. Similarly the CPU 100 data lines are switched to the RAM 204 data lines by multiplexer 207A. Thus every fourth time slot CPU 100 has access to RAM 204. During this time CPU 100 can read or write from or to RAM 204 and change the volume gain factors and read the accumulator values. CPU 100 normally reads the accumulator values for all 32 channels every 8 ms. After reading the values, CPU 100 then writes a zero in each of the 32 locations to clear that location and to start the accumulation from a zero count. Thus CPU 100 has a real time indication of the audio power of each of the 32 channels by comparing the audio powers of the receive and transmit signals of the channels for one telephone connection. CPU 100 can thereby process this information and determine what appropriate volume gain should be applied to each side to implement a voice path switching function for speaker-phone applications.

FIGS. 11A through 11L illustrate, in flowchart form, the program for controlling digital audio processor 220 residing in program memory 120 of station CPU 100. In the flowchart, the designation Tx refers to data transmitted from a telephone station and Rx refers to data received by a telephone station. Cross reference between the designation used in the station interface diagram of FIG. 2 to this designation is shown in the lower portion of FIG. 11.

Figure 11A:
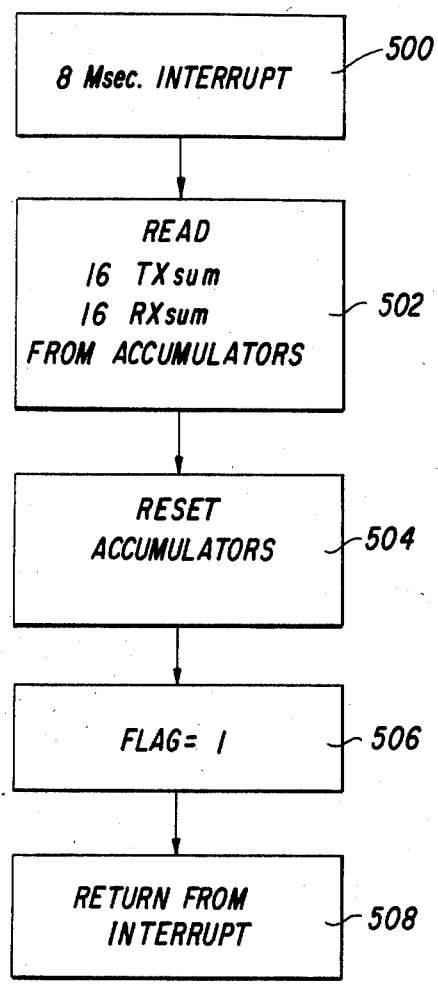
Figure 11B:
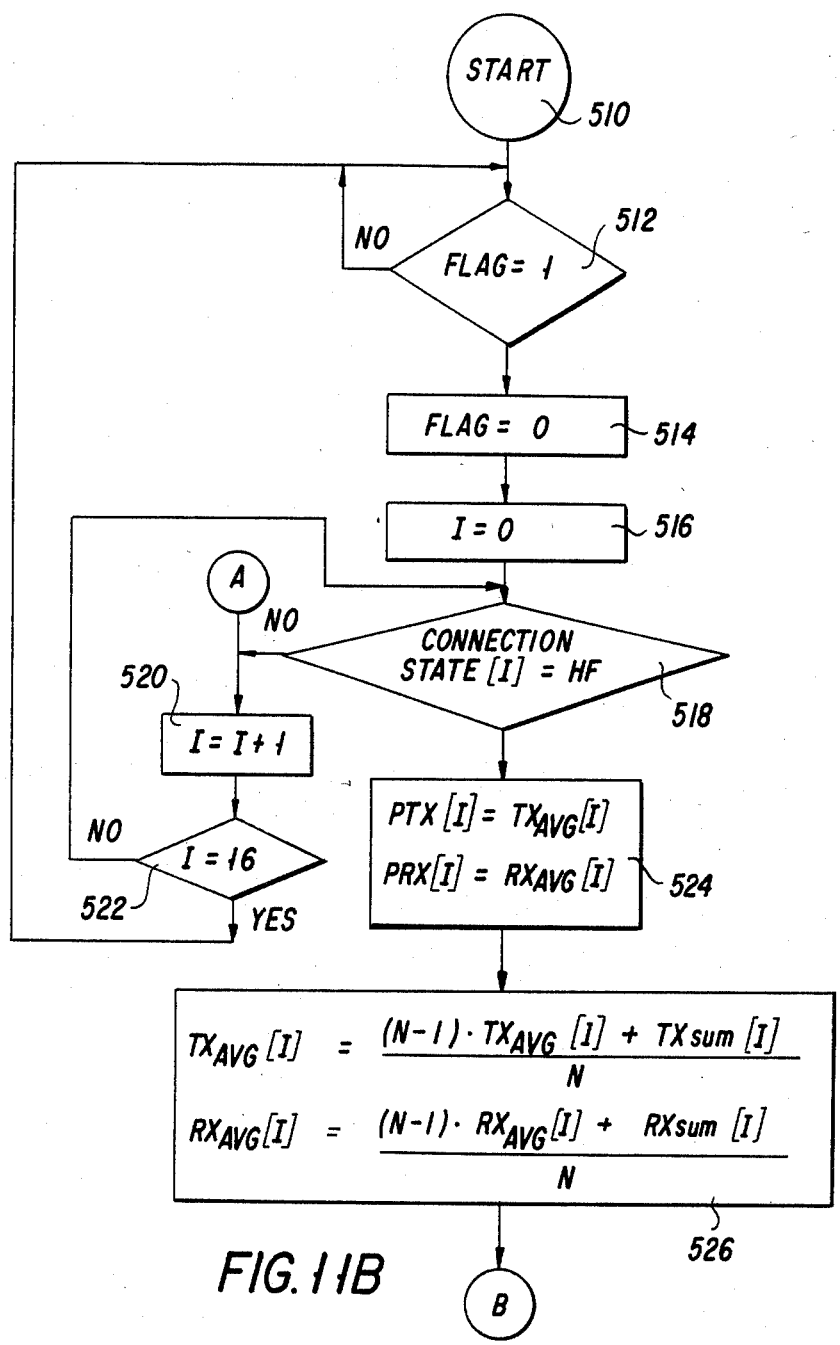

FIG. 11A shows a part of the non-maskable interrupt routine which occurs ever 8 ms. At step 500, the interrupt routine is entered. At step 502, 16 samples of the accumulated sums for both transmit and receive data, TxSUM and RxSUM, are read from the accumulator portion of RAM 204 by station CPU 100 and stored in the RAM portion of memory 120. At step 504, all accumulator locations are reset so that a new accumulator cycle can begin. Following reset, an 8 msec. flag is set to 1 and at step 508, the interrupt routine is left at which point the program shown in the flowchart of FIG. 11B is entered at 510.

At step 512, the flag is checked to determine if it has been set to 1, indicating that the interrupt routine has terminated. If it has been set to 1, it is then reset to 0 at 514. At 516, a channel counter I is reset to 0. At 518, it is determined whether the connection state of each channel is in hands-free mode. If it is not, the channel counter is incremented at 520. A check is made at 522 to determine if the channel counter has reached 16, i.e., the last channel has been serviced and reached the decision block 518. If I=16, a return to START is made.

In the RAM portion of memory 120, a location for each channel is maintained for the average value of both the transmit and receive data. These average values are designated TxAVG for transmit and RxAVG for receive. At step 524 the previous values of TxAVG and RxAVG, PTx and PRx, respectively, are set to the current values of TxAVG and RxAVG, respectively. At step 526 new values for TxAVG and RxAVG are calculated. N is an arbitrary time constant after which a speech signal has reached a steady state value. In the illustrated embodiment, N is set to 8. TxSUM and RxSUM are the values retrieved by CPU 100 from the accumulator portion of RAM 204 for transmit and receive data, respectively. As shown at step 526, a time weighted average for the new average values is computed. The program then enters the flowchart of FIG. 11C.

Figure 11C:
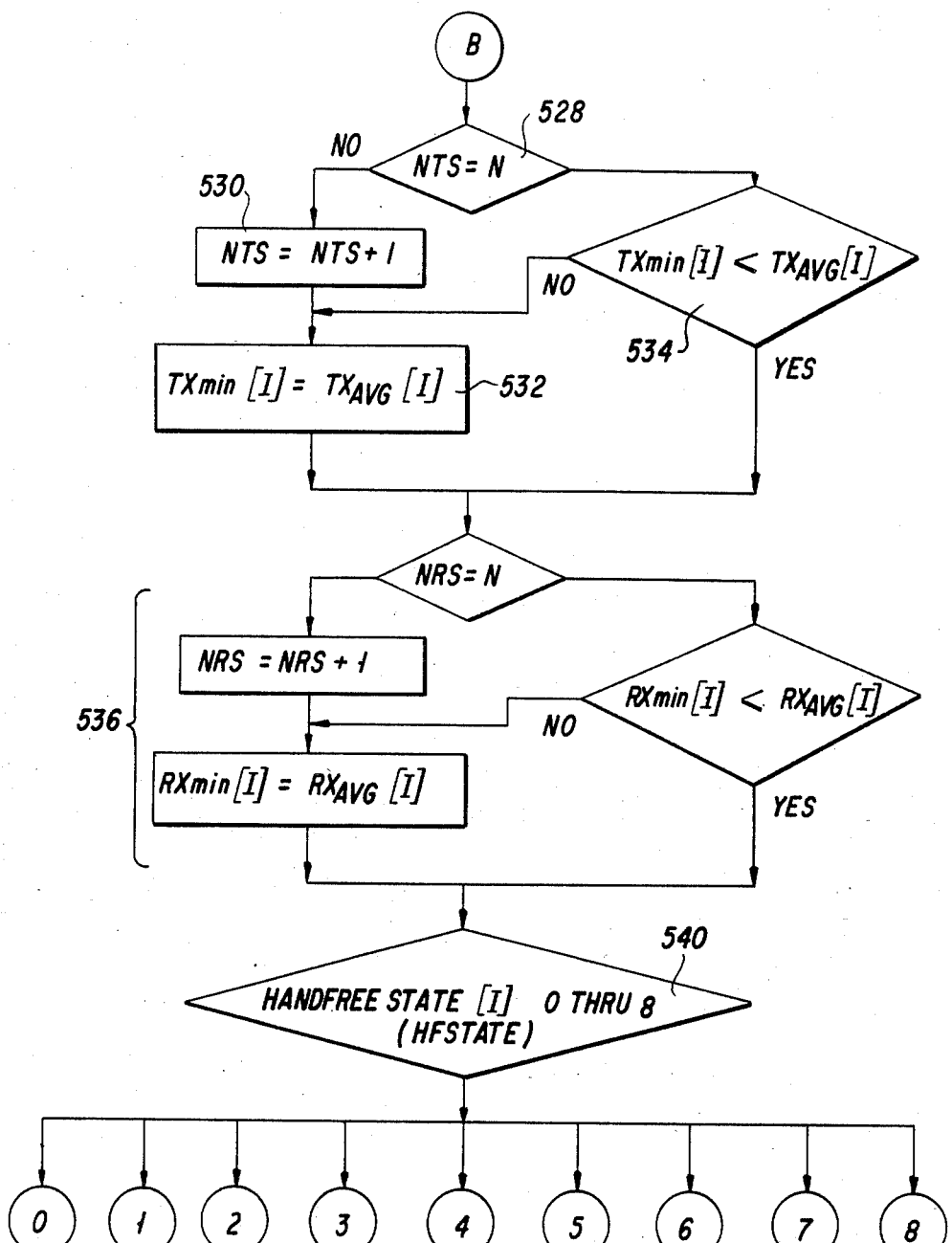

As shown in FIG. 11C, the program first determines if a counter designated NTS has reached the value N used in calculating the average values. This is shown by step 528. Essentially, the section of the program shown in FIG. 11C is used to determine the level of background noise present on a particular channel. If NTS is less than the value N, then NTS is incremented at 530. The transmit background noise level TxMIN is assigned the same value as the transmit average value, TxAVG, at 532. Once NTS=N, i.e., the voice data has reached a steady state value, the present value of TxMIN is compared to TxAVG at 534. If TxMIN is greater than or equal to TxAVG, TxMIN is set to TxAVG at 532, i.e., the level of background noise is set to TxAVG calculated at time N. If TxMIN is less than TxAVG, then TxMIN is not altered, i.e., the background noise level remains at the value determined at time N.

Similarly, the receive noise level at the telephone on the channel is calculated as shown by the steps identified at 536. NRS is is a counter similar to NTS used in determining when the receive signal has reached a steady state value.

In the event that a silent period in a speech signal is obtained, the average values could theoretically drop to zero, thus resulting in an incorrect value for the noise levels. To prevent this, both TxMIN and RxMIN are automatically incremented by 1 every half second by the operating system program. In this way, TxMIN is again allowed to reach a steady state value after a silent interval.

After the noise levels have been calculated, the hands-free state of the connection is determined at 540. Eight different hands-free states are shown in the illustrated embodiment, as follows:

0—initialize hands-free (start receiving)
1—listening to other party in handset mode
2—listening to other party in hands-free mode
3—listening to trunk or conference call
4—start talking 5—talking to other party in handset mode
6—talking to other party in hands-free mode
7—taking to trunk or conference call
8—intermediate talk—(silent interval)

Hands-free state 0 identifies the start of a hands-free call. As shown in FIG. 11D, the first step performed is the setting of transmit and receive gains, TxGAIN and RxGAIN, at 542 TxGAIN is set to a minimum level, i.e., maximum attenuation and RxGAIN is set to a nominal level, RGAIN. These values are written by CPU 100 into RAM 204 as described above. The type of call is then determined at 544. If a conference or outside trunk call, the hands-free state is set to 3 at 546 and a return is then made to point A in FIG. 11B. After servicing other channels, the program will return to the channel now under consideration, but it will exit through hands-free state 3 in FIG. 11C to FIG. 11G.

If the call is not an outside trunk or conference call, a determination is made if the other party is also in hands-free mode at 548. If so, the hands-free state is set to 2 at 550 and a return is made to point A to increment the channel counter. If the other party is not in hands-free, the state is set to 1 at 552 and a return is made to point A.

In hands-free state 1, as shown in FIG. 11E, the user is listening to the other party in handset mode. Accordingly, CPU 100 determines if RxSUM obtained from the accumulator portion of RAM 204 is greater than the previous value of the receive average value by a constant threshold T1 at 554. If it is, a state counter SC is set to 0 at 556. This state counter, when non-zero, indicates a quiet period in the received signal. When state counter SC is set to 0, this indicates that the other party is transmitting data to the telephone over the channel being serviced.

If RxSUM is not greater than PRX by threshold T1, a determination is then made whether the average value RxAVG is greater than the receive noise level RxMIN by threshold T2 at 558. If it is, the state counter SC is set to 0 at 556, indicating receive voice signal on the channel. If RxAVG does not exceed RxMIN by the threshold T2, exit is made to point C of FIG. 11H. This indicates that a silent period in the receive signal has been encountered. This will be described in more detail with reference to FIG. 11H.

Figure 11F:
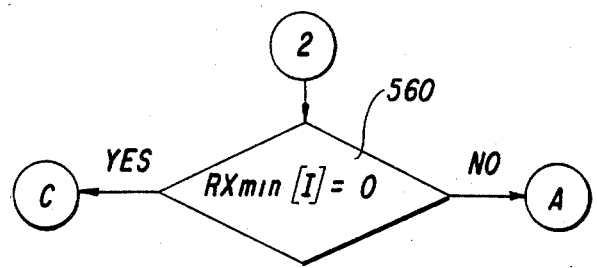

FIG. 11F illustrates the program flow in state 2, i.e., when listening to the other party in hands-free mode. Essentially, the receive noise level RxMIN is checked to see if it is 0, at 560. If it is not, return is made to point A, indicating that other channels are then to be serviced. The hands-free state of the channel serviced is not changed, however. Should RxMIN=0, then an exit is made to point C of FIG. 11H, indicating that the other party has ceased talking.

Figure 11G:
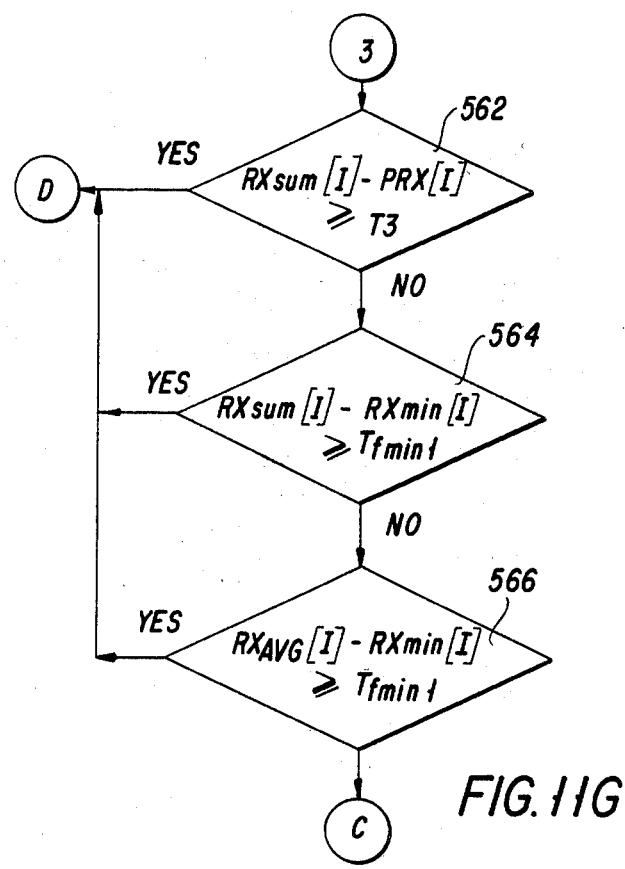

FIG. 11G illustrates the processing which occurs when a particular telephone channel is receiving signal from an outside trunk or conference call. At 562, the receive volume accumulated value is checked to determine if it exceeds the previous average receive value by a threshold T3, then an exit is made to point D in FIG. 11E, and state counter SC is set to 0. This indicates that the other party is talking.

If RxSUM does not exceed PRX by T3, then a determination is made whether it exceeds the noise level RxMIN by a variable threshold TfMIN, which is a function of RxMIN, at 564. If it does, the state counter is again set to 0 by entering point D.

If RxSUM does not meet the test at 564, a check is made at 566 to determine if the average receive value exceeds RxMIN by TfMIN. If it does SC is again set to 0 through exit point D. If it does not, point C is entered in FIG. 11H. This indicates that the other party has stopped talking or a silent interval has occurred.

Figure 11H:
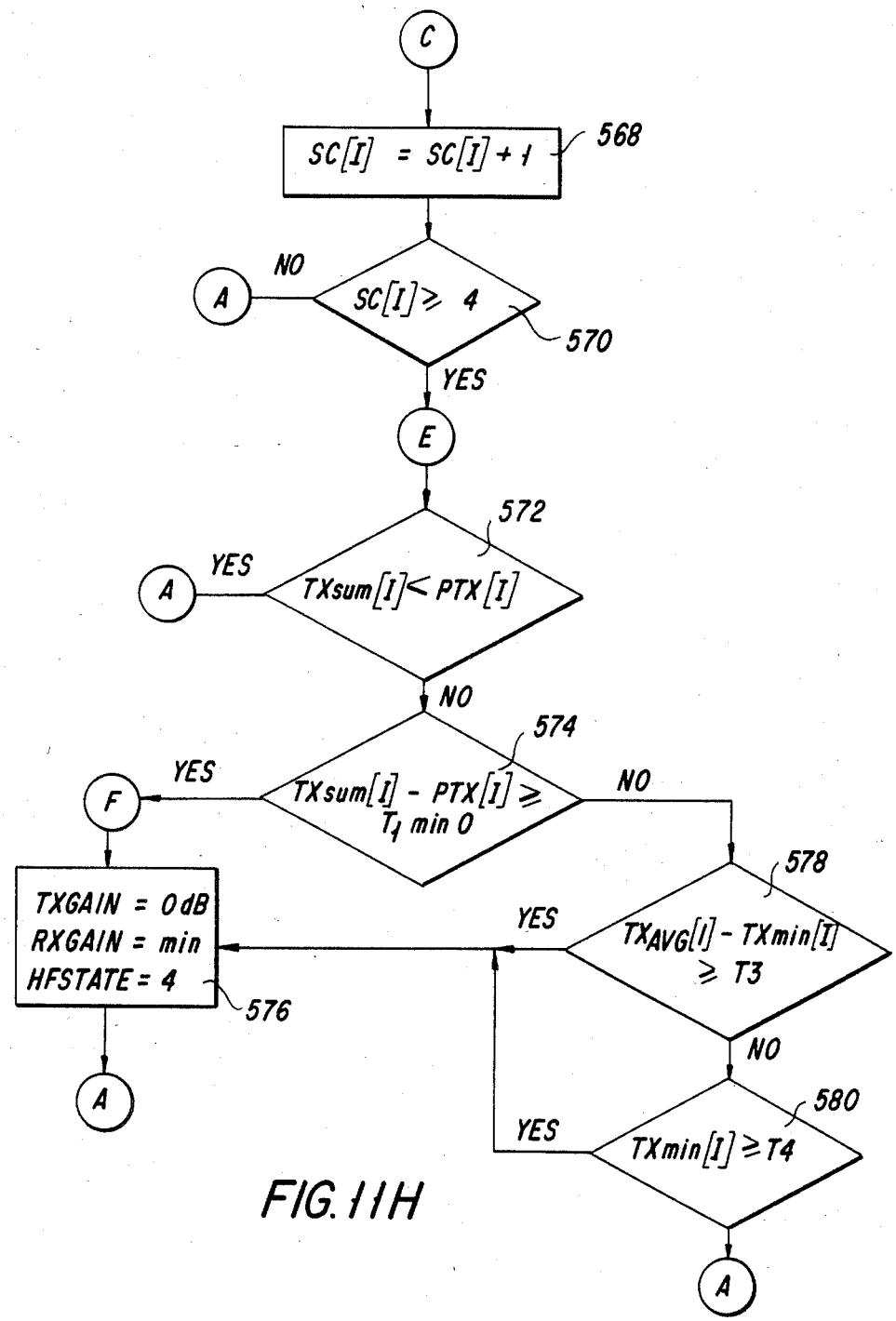

If FIG. 11H, the silence counter is first incremented by 1 from its previous value at 568. A check is then made at 570 to determine if the state counter (silence counter) has incremented to 4. If it has not, then exit is made to point A, and no state change occurs. If the state counter has reached 4, then the transmit accumulated value is compared to the previous average value at 572. If TxSUM is less than PTX, then exit is made to point A. This indicates that no voice signal is present in the transmit signal.

If TxSUM is greater than or equal to PTX, a check is made at 574 to determine if it is greater than PTX by a variable threshold TfMINO. If it is, exit is made to point F and TxGAIN is set to 0dB; RxGAIN is set to maximum attenuation and the hands-free state is set to 4 at 576. This indicates that voice signal is present in the transmit signal and a gain level is written into RAM2 204 to modify the transmit signal and the receive signal is attenuated.

If TxSUM does not exceed PTX by the threshold TfMINO, the average transmit value TxAVG is checked to determine if it is greater than TxMIN by a constant threshold T3 at 578. If it is, step 576 is again entered and the hands-free state is set to 4. If the test at 578 is not met, TxMIN is compared to fixed threshold T4. If TxMIN, the transmit noise level, is greater than the threshold, step 576 is again entered. Otherwise entry is made to point A and the hands-free state is not changed, i.e., the transmit party remains silent.

FIG. 11I illustrates the processing for hands-free state 4, i.e., the start of the transmit signal at a particular telephone. At step 582, TxSUM from the accumulator is compared to the previous average value. If it is less than the previous average value, the hands-free state is set to 0 at 584, TxGAIN is set to maximum attenuation, RxGAIN is set to a nominal value RGAIN and the NRS counter is reset at 586. Entry is then made to point A. This indicates that the party has ceased talking at a particular telephone station and the hands-free state is reset to 0, i.e., the start of receiving at the telephone.

If TxSUM is greater than PTX, the type of call is determined at 588. If a conference or trunk call, the hands-free state is set to 7 at 590 and point A is entered. If not a conference or trunk call, a determination is made at 592 whether the other party is in hands-free. If true, the hands-free state is set to 6 at 594. If false, the hands-free state is set to 5 at 596. In both cases, exit is then made to point A.

FIG. 11J shows the flow for the situation where a telephone user is talking to the other party in handset mode. At 598 the transmit noise level is compared to a fixed threshold T4. If the background noise is low, the accumulated transmit sum is compared to a fixed threshold T5 at 600. If the sum is greater than T5, exit is made to point A. If the background noise is high (TxMIN greater than or equal to T4) or if TxSUM is less than T5, the receive sum RxSUM is checked to determine if it is greater than the previous average by T6 at 602. If it is, entry is made to point 6. If not, entry is made to point A. Entry to point G indicates the start of hands-free state 0.

Figure 11K:
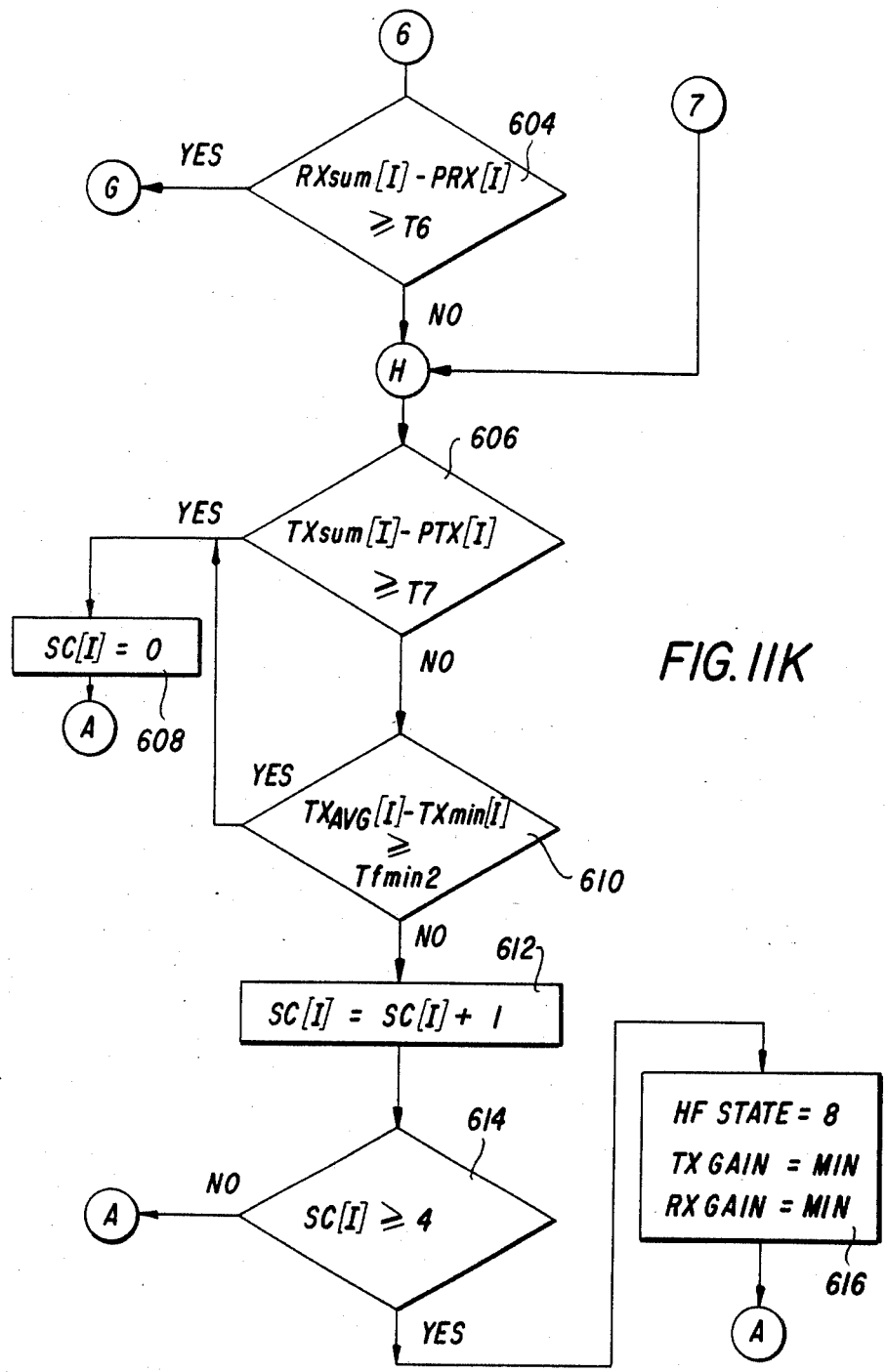

FIG. 11K illustrates the flow for hands-free states 6 and 7, i.e., talking to another party in hands-free mode or talking to a trunk or conference call. At 604, in state 6, a determination is made whether the accumulated receive sum is greater than the previous average by threshold T6. If yes, exit is made to point 6 in FIG. 11I, hands-free state 0. If no, TxSUM is checked to determine if it is greater than PTX by threshold T7 at 606. This also corresponds to the entry point for hands-free state 7. If yes, the state counter is set to 0 at 608, indicating that the transmit line is active. If no, a decision is made at 610 whether TxAVG is greater than TxMIN by a variable threshold TfMIN2. If it is, then the state counter is set to 0. If not, the state counter is incremented at 612. The state counter is then checked at 614 to determine if it has incremented to 4. If it has, hands-free state 8 is set at 616 and TxGAIN and RxGAIN are set to minimum, i.e., maximum attenuation. In either case, exit is then made to point A. Hands-free state 8 indicates that a silent period in the transmit signal of a duration long enough to increment the state counter to 4 has occurred. The state counter will increment to 4 after approximately 32 msecs. Switchover to state 8 occurs during the silent interval.

Figure 11L:
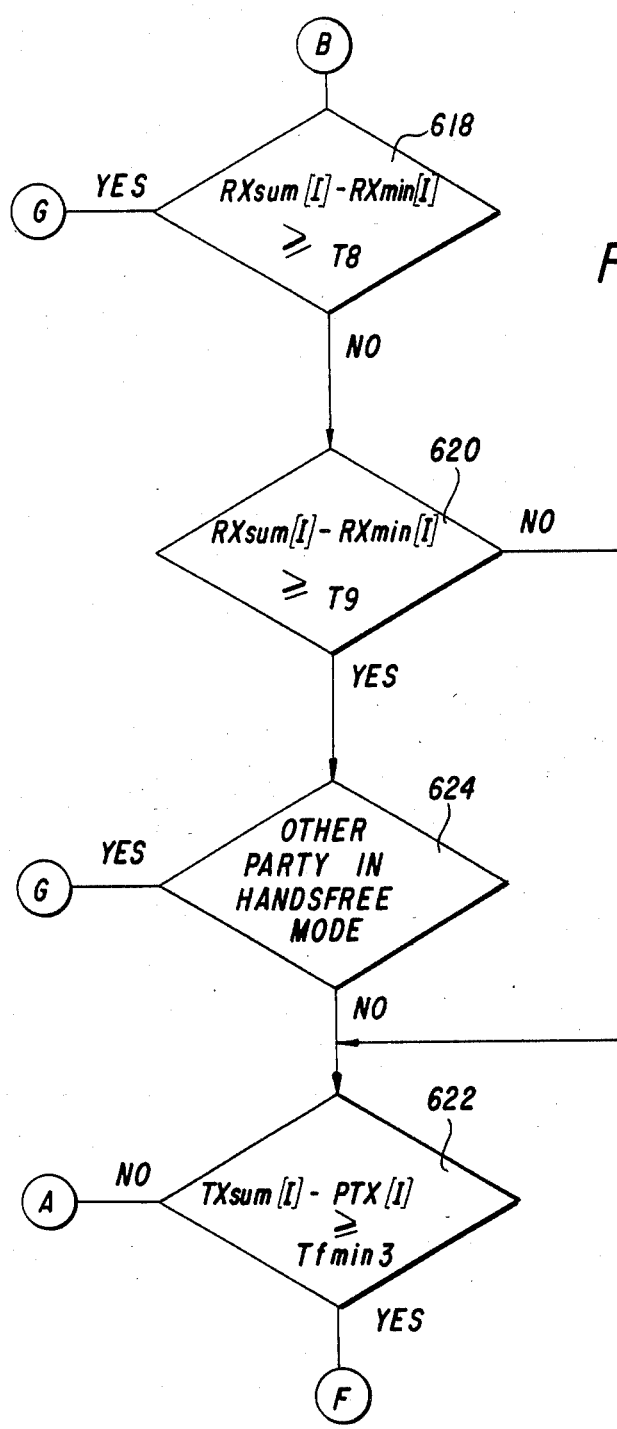

FIG. 11L indicates the processing for hands-free state 8. At 618, the receive accumulated sum is compared to the receive noise level to determine if it exceeds the noise level by a fixed threshold T8. If it does, exit is made to point G, i.e., automatic switchover to hands-free state 0. If RxSUM does not exceed the noise by T8, a determination is made at 620 whether the receive sum exceeds the receive noise by threshold T9. If no, the transmit sum is compared to the previous transmit average to determine if it exceeds the average by variable threshold TfMIN3 at 622. If it does, this indicates that the transmit signal has become active, i.e., a voice signal is present, and a switchover to hands-free state 4 is made via point F of FIG. 11H. Otherwise a return is made directly to point A.

If decision 620 is true, then a determination at 624 is made whether the other party is in hands-free mode. If yes, entry is made into point G of FIG. 11I, i.e., hands-free state is set to 0, indicating the start of hands-free receiving. If no, the determination of whether transmission has occurred from the particular telephone being serviced is made at 622.

Figure 15:
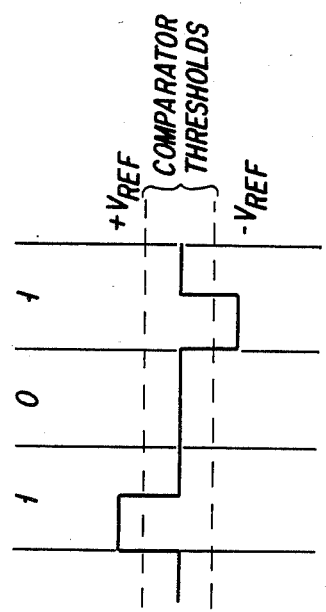
FIG. 15 is a diagram showing the bipolar data transmission format for digital signals transmitted from the telephone stations to the KSU.

Interface circuitry for coupling the station interface to the digital telephones is shown in FIGS. 13 and 14. The interface circuitry for signals received from the telephones (RxSet) are shown in FIG. 13. The tip and ring conductors of the receive pair are coupled to isolation/filter circuit 252. This circuit includes dc coupling of the positive side of the telephone set power through phantom coupling and transformer coupling of the received data. Each of the circuits 252 are coupled to multiplexer 280. The format of the multiplexed serial signals is shown in FIG. 15. This signal is bipolar in form to provide optimum frequency response and coupling through transformers. The bipolar signal is then fed to doubled-ended comparator 254 comprising two comparators having + and − voltage references to decode the signal into unipolar binary form. The unipolar signal is then delayed by a fixed delay stage 255 to compensate for loop delays experienced in transmission to and from the telephones. Variable compensation for loop delays is implemented in the telephones themselves and is necessary so that the data entering audio processor 220 from the telephones (RxSet) (214 in FIG. 2) is delayed by a multiple of 125 usecs from TxSet (215 in FIG. 2), which is the total delay through audio processor 220.

The transmit interface is shwon in FIG. 14. Serial PCM data from converter 210 (via multiplexer 230) is fed to gate 256. Frame synchronizing bits are gated into the serial signal to identify the start of a PCM frame. The PCM signal is also modulated into the bi-phase format shown in FIG. 16. In this format, a "0" is represented by a rising edge and a "1" is represented by a falling edge. Frame synchronizing markers are identified by logical "0" or "1" levels which extend for two bit periods, i.e., intervals which violate the bi-phase encoding scheme. Channel O-7 and 8-F frame markers, respectively, are opposite in phase and provide means for determining at the telephone stations which telephone station is to receive the data, since two telephones share a common transmission path. The signalling formats to and from the telephone sets will be described in greater detail in FIGS. 17, 18 and 19.

Figure 16:
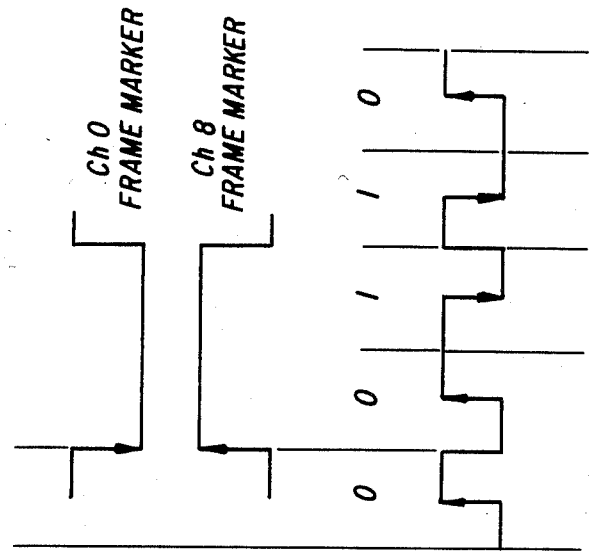
FIG. 16 is a diagram showing the data transmission format for digital signals transmitted from the KSU to the telephone stations.

The serial data is then demultiplexed into 8 channels by demultiplexer 260. Each channel includes information for two telephones. The telephones decode the proper data by identifying the correct frame marker for that telephone, as shown in FIG. 16. The de-multiplexed data is then coupled to signal driver 262 and transformer isolation circuitry 262. The negative side of power for the telephones is phantomed to the telephones over the transmit ring and tip pair. In the illustrated embodiment, the differential voltage across the phantom pair is nominally 24 volts.

Figure 17:
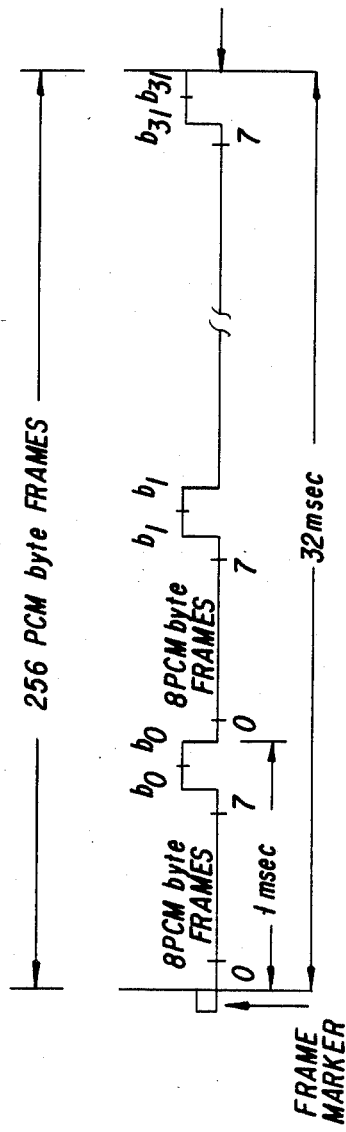
FIG. 17 is a diagram showing the manner in which control signals are interleaved in the digital signals originating at the station interface of the KSU and transmitted to the telephone stations.

FIG. 17 illustrates the format of data transmitted to the input of multiplexer 260. A frame marker is generated every 32 msecs. Every 8 PCM byte frames (1 msec.) signalling information is interleaved into the serial data. This signalling data is inserted by multiplexer 230 (see FIG. 2) from an input from signalling register 300, to be described in more detail below. The signalling data comprises two bits of information, one for each telephone which shares a common transmission path. Because the frame marker is received inverted by one of the telephones, that telephone can identify the proper bit for reception by synchronizing with the frame marker. This is described in more detail in the aforementioned copending patent application of Vincent Viascheslav Korsky. As shown in FIG. 17, each signalling word, which controls such functions at the telephone as flashing LED's, enabling or disabling speakers and microphones, controlling A/D conversion and adjusting phase delays, is 32 bits long.

Figure 19:
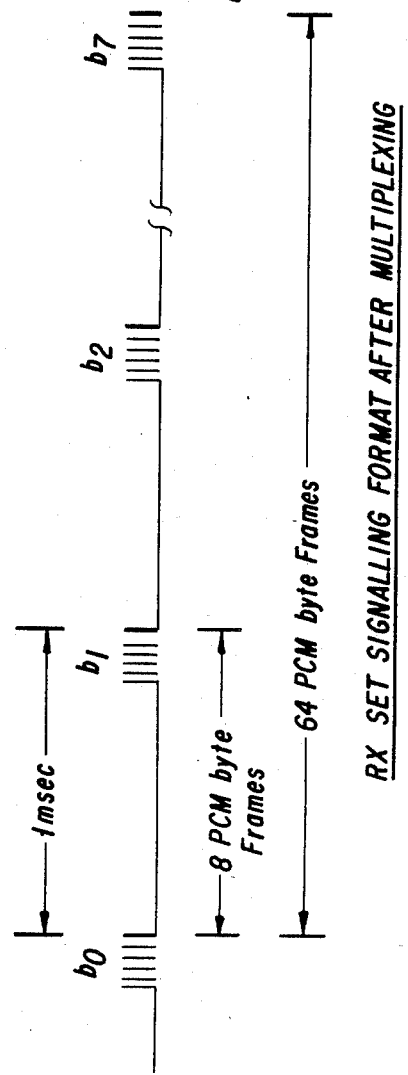
FIG. 19 is a diagram showing the manner in which control signals are interleaved in the digital signals originating from the telephone stations and received by the station interface of the KSU after multiplexing.

FIG. 19 illustrates the signalling format of data received from the telephones after multiplexing by multiplexer 280. As shown, every 8 PCM byte frames, control information comprising 16 bits (1 bit for each channel) is interleaved in the serial PCM stream, in effect robbing the least significant bit of every eighth PCM sample for all 16 channels.

Figure 18:
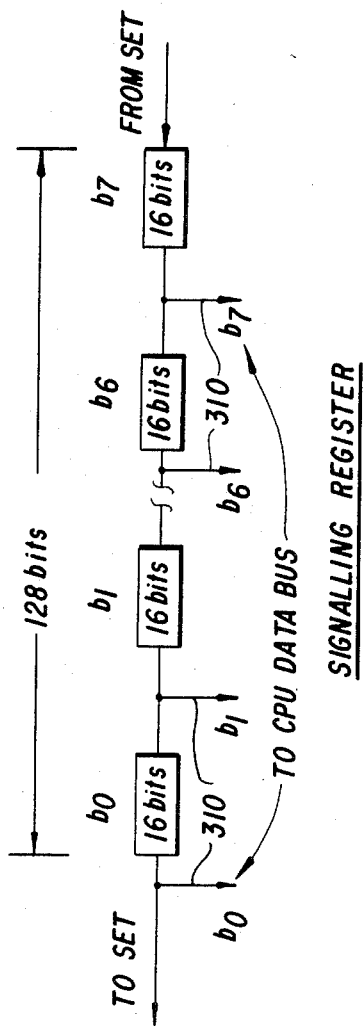
FIG. 18 is a diagram showing the structure of the signalling register of FIG. 2.

Insertion of control information into the PCM stream to the telephones and CPU 100 reading of the control information from the telephones is accomplished by signalling register 300 (see FIG. 2), shown in more detail in FIG. 18. Signalling register 300 comprises a 128 bit shift register having parallel taps spaced every 16 bits. Signalling register 300 is used for both reading control information from the telephones and for arranging control information to be transmitted to the telephones.

PCM data from the telephones is clocked into register 300. Register 300 is clocked 16 times every millisecond when signalling bits are present by time base generator 350. Thus, the 16 corresponding bits of the control information for all 16 telephones are present in each portion of the shift register 300 every millisecond. Every 8 milliseconds, CPU 100 accesses the register via the parallel taps 310.

At the same time that signalling data is being shifted into register 300 from the telephones, control data is being shifted out to the phones, as shown in FIG. 18. Accordingly, the same shift register is used for both signalling to the telephones and from the telephones. After CPU 100 reads signalling data from register 300, it writes control data into the register for insertion into the serial PCM stream by multiplexer 230.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus in a digital electronic telephone switching system for coupling a plurality of digital telephone instruments to a digital data bus having a plurality of time division multiplexed digital data channels allotted thereon, and for enabling two way communication between selected ones of said telephone instruments and said digital data bus comprising:

means coupled to said digital data bus for temporarily storing digital data transmitted on said bus, said storing means comprising a plurality of storage locations, each storage location corresponding to a channel of said digital data bus;

first time division multiplexing means coupled to said telephone instruments for receiving a plurality of first signals from said telephone instruments and for converting said first signals into a first time-division multiplexed serial signal;

second time-division multiplexing means coupled to said telephone instruments for receiving a second serial signal having digital data for each of said telephone instruments time-division multiplexed thereon and for converting said digital data of said second serial signal into a plurality of parallel serial data streams for each of said telephone instruments;

control means including computer means coupled to said storing means for succesively selecting desired ones of said plurality of storage locations, thereby providing a serial selected digital data signal from the storing means; and processing means coupled to said storing means, said digital data bus and said first and second time division multiplexing means for digitally processing the serial selected digital data signal from said storing means and said first serial signal so as to modify the digital representation of the amplitude of voltage levels represented by said serial selected digital data signal and said first serial signal so as to produce a modified serial selected digital data signal and a modified first serial signal, said modified serial selected digital data signal being coupled to said second time-division multiplexing means as said second serial signal and said modified first serial signal being coupled to said digital data bus.

2. The apparatus recited in claim 1 wherein said digital data on said data bus comprises a plurality of channels of pulse code modulated samples of analog voice signals, said digital data being arranged in time on said data bus so that corresponding bits of said plurality of channels are transmitted in successive bit frames of said corresponding bits.

3. The apparatus recited in claim 2 wherein said digital data bus comprises a plurality of like data buses and said storing means comprises:

first memory means for storing bit frames comprising odd numbered bits from each channel for each bus;

second memory means for storing bit frames comprising even numbered bits from each channel for each bus;

said control means further comprising means for alternately selecting said first and second memory means whereby digital data from said buses is written into one of said first and second memory means while selected digital data is read out of the other of said first and second memory means.

4. The apparatus recited in claim 3 wherein a termination address is associated with each of said telephone instruments and said control means comprises multiplexer means for alternately selecting said first and second memory means and third memory means addressed by said computer means having data contained therein corresponding to said termination addresses for placing said selected digital data from said storing means in selected time sequence in said serial selected digital data signal.

5. The apparatus recited in claim 1 wherein said processing means comprises:

means receiving said first serial signal and said serial selected digital data signal from said storing means for alternately converting selected bits of said first serial signal and said serial selecting digital data signal into a plurality of parallel data bits, said plurality of parallel data bits each representing a sample of an analog voice signal;

digital audio processing means receiving said plurality of parallel data bits for digitally modifying the digital representation of the amplitude of the analog voice signal represented by said parallel data bits so as to produce a digitally modified signal comprising digitally modified parallel data bits;

means receiving said digitally modified parallel data bits for reconverting said parallel data bits into a third serial signal comprising digitally modified digital data from said serial selected digital data signal and from said first serial signal; and means receiving said third serial signal for extracting said digitally modified digital data from said serial selected digital data signal for transmission to said second time division multiplexing means and for extracting said modified digital data from said first serial signal for transmission to at least one of said digital data buses.

6. The apparatus recited in claim 5 wherein said means for alternately converting comprises:

means for combining said serial selected digital data signal and said first serial signal into a fourth serial digital signal having corresponding bits from said serial selected digital data signal and said first serial signal in alternating sequence; and shift register means for storing said fourth serial digital signal and for converting said fourth serial digital signal into said parallel data bits.

7. The apparatus recited in claim 6 wherein said shift register means comprises first and second shift registers, and further comprising multiplexer means for coupling said fourth serial digital signal alternately to said first and second shift registers, said shift registers alternately converting said fourth serial digital signal into said parallel data bits.

8. The apparatus recited in claim 7 wherein said means for reconverting comprises said first and second shift registers and said two shift registers alternately reconvert said digitally modified parallel data bits into said third serial signal.

9. The apparatus recited in claim 5 wherein said means for extracting comprises de-multiplexer means.

10. The apparatus recited in claim 5 wherein said digital audio processing means is coupled to said computer means and comprises multiplication mean for forming a digital representation of a product of said analog voice signal represented by said parallel data bits and modification digital data supplied by said computer means.

11. The apparatus recited in claim 10 wherein said multiplication means comprises:
first memory means having address inputs coupled to said means for alternately converting for generating selected successive outputs associated with said address inputs;
second memory means coupled to said computer means having data inputs for receiving said modification digital data from said computer means;
adding means for forming a first sum of a selected output of said first memory means and said modification data;
means for coupling said first sum to the address inputs of said first memory means whereby said first memory means generates a selected output associated with said sum;
and further comprising means for accumulating a second sum of a selected output of said first memory means, said second sum being available to said computer means, said computer means responsive to said sum so as to produce said modification digital data.

12. The apparatus recited in claim 11 wherein:
said first memory means comprises means for selectively outputting, in response to an input signal at said address inputs, a digitally encoded signal proportional to one of the logarithm, antilogarithm or amplitude of said input signal;
said second memory means comprises means for storing said modification digital data, said modification digital data being proportional to the logarithm of a gain modification factor; and
said adding means comprises means for generating a sum signal proportional to the sum of said digitally encoded signal proportional to the logarithm of said input signal and said logarithm of a gain modification factor;
said means for coupling coupling said sum signal to said first memory means as an input signal whereby said first memory means outputs a second selected output proportional to said antilogarithm of said sum signal.

13. The apparatus recited in claim 12 wherein said means for accumulating comprises a part of said second memory means, and wherein said first memory means further outputs said digitally encoded signal proportional to the amplitude of said input signal, said second memory means being coupled to said adding means, said adding means summing said digitally encoded signal proportional to the amplitude of said input signal with said sum from said second memory means to produce said second sum.

14. The apparatus recited in claim 13, further comprising latch means coupling said adding means to said second memory means for storing said second sum.

15. The apparatus recited in claim 1 wherein said first and second time-division multiplexed serial signals include interleaved control signalling data, and further including signalling register means coupled to said first and second time-division multiplexing means and said computer means for alternately accumulating control signalling data in said first serial signal from said first time-division multiplexing means, said computer means periodically accessing said accumulated control signalling data, and for inserting control signalling data written into said signalling register means by said computer means into said second time-division multiplexed serial signal.

* * * * *

UNITED STATES PATENT AND TRADEMARK OFFICE
CERTIFICATE OF CORRECTION

PATENT NO. : 4,577,310

DATED : March 18, 1986

INVENTOR(S) : Vincent Korsky et al.

It is certified that error appears in the above-identified patent and that said Letters Patent is hereby corrected as shown below:

Column 1, line 24, change "lines are" to --line as--.

Column 5, line 35, change "on" to --in--.

Column 5, line 58, change "modified" to --modifies--.

Column 5, line 59, change "rovides" to --provides--.

Column 6, line 13, change "codingg" to --coding--.

Column 7, line 12, change "from" to --frame--. (2nd occ.)

Column 7, line 19, change "PCM bit" to --PCM bits--.

Column 8, line 21, change "aplied" to --applied--.

Column 8, line 42, change "bit shaft" to --bit shift--.

Column 8, line 56, change "intervals which" to --intervals in which--.

Column 10, line 50, change "a 8" to --an 8--.

Column 12, line 12, change "areturn" to --a return--.

UNITED STATES PATENT AND TRADEMARK OFFICE
CERTIFICATE OF CORRECTION

PATENT NO. : 4,577,310

DATED : March 18, 1986

INVENTOR(S) : Vincent Korsky, et al.

It is certified that error appears in the above-identified patent and that said Letters Patent is hereby corrected as shown below:

Column 13, line 3, change "taking" to --talking--.

Column 16, line 3, change "shwon" to --shown--.

Column 18, line 35, change "selecting" to --selected--.

Column 19, line 15, change "mean" to --means--.

Signed and Sealed this

Nineteenth Day of August 1986

[SEAL]

Attest:

DONALD J. QUIGG

Attesting Officer

Commissioner of Patents and Trademarks